US011908026B2

United States Patent
Bernstein et al.

(10) Patent No.: US 11,908,026 B2
(45) Date of Patent: Feb. 20, 2024

(54) DETERMINING USER INTERFACE INFORMATION BASED ON LOCATION INFORMATION

(71) Applicant: DOORDASH, INC., San Francisco, CA (US)

(72) Inventors: Benjamin R. Bernstein, San Francisco, CA (US); Jeffrey Frank Iacono, San Francisco, CA (US); Jesse Lee Reiss, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 215 days.

(21) Appl. No.: 17/196,032

(22) Filed: Mar. 9, 2021

(65) Prior Publication Data

US 2021/0192648 A1    Jun. 24, 2021

Related U.S. Application Data

(63) Continuation of application No. 14/926,056, filed on Oct. 29, 2015, now Pat. No. 10,977,751.

(51) Int. Cl.
*G06Q 50/12* (2012.01)
*G06Q 30/0601* (2023.01)
(Continued)

(52) U.S. Cl.
CPC .............. *G06Q 50/12* (2013.01); *G01S 19/12* (2013.01); *G06Q 10/0832* (2013.01); *G06Q 30/0635* (2013.01)

(58) Field of Classification Search
CPC ............... G06Q 50/12; G06Q 10/0832; G06Q 30/0635; G06Q 10/083; G06Q 50/28; G05B 2219/32029
See application file for complete search history.

(56) References Cited

U.S. PATENT DOCUMENTS 6,026,375 A    2/2000 Hall et al.
6,324,476 B1    11/2001 Trovato
(Continued)

FOREIGN PATENT DOCUMENTS

WO    2011/140130 A2    11/2011

OTHER PUBLICATIONS

GPS Comes To High-Tech Pizza Delivery Tracking; One Papa John's chain lets customers track their deliveries street by street. Domino's, meanwhile, is making its own tracking technology push, CMP Media Inc., pp. 1-2 (Feb. 1, 2008).
(Continued)

*Primary Examiner* — Peter Ludwig
*Assistant Examiner* — Avia Salman
(74) *Attorney, Agent, or Firm* — MATTINGLY & MALUR, PC

(57) ABSTRACT

In some examples, a computing device may receive, from a plurality of merchant devices associated with a plurality of merchants, respectively, electronic communications indicating pickup locations associated with the respective merchants. The computing device may access map information to determine a group of the respective pickup locations within a threshold distance of each other, the group of respective pickup locations corresponding to a group of the merchants. The computing device may send, to a buyer device, based at least on the pickup locations determined to be within the threshold distance of each other, merchant information that causes, at least in part, an application on the buyer device to present a user interface including information about the group of merchants, the information about the group of merchants including an indication that items ordered from the merchants in the group of merchants are available for combined delivery.

20 Claims, 11 Drawing Sheets

(51) Int. Cl.
  *G06Q 10/0832* (2023.01)
  *G01S 19/12* (2010.01)

(56) References Cited

U.S. PATENT DOCUMENTS

| | | | |
|---|---|---|---|
| 8,458,044 B2 | 6/2013 | Blair et al. | |
| 8,504,435 B2 | 8/2013 | Charles | |
| 9,269,103 B1 | 2/2016 | Kumar et al. | |
| 9,466,045 B1 | 10/2016 | Kumar | |
| 9,639,908 B1 | 5/2017 | Reiss et al. | |
| 9,679,489 B2 | 6/2017 | Lambert et al. | |
| 9,754,331 B1 | 9/2017 | Beckelman et al. | |
| 9,811,838 B1 | 11/2017 | Daire et al. | |
| 9,846,086 B1 | 12/2017 | Robinson et al. | |
| 9,858,614 B2 | 1/2018 | Seaward et al. | |
| 10,133,995 B1 | 11/2018 | Reiss et al. | |
| 10,181,111 B1 | 1/2019 | Kohli et al. | |
| 10,346,889 B1 | 7/2019 | Reiss et al. | |
| 2002/0077937 A1 | 6/2002 | Lyons et al. | |
| 2002/0138350 A1 | 9/2002 | Cogen | |
| 2002/0143655 A1 | 10/2002 | Elston et al. | |
| 2002/0178074 A1 | 11/2002 | Bloom | |
| 2003/0125963 A1 | 7/2003 | Haken | |
| 2005/0058755 A1 | 3/2005 | Chambers | |
| 2005/0236478 A1 | 10/2005 | St. Clair et al. | |
| 2006/0121161 A1 | 6/2006 | Garrett | |
| 2006/0136237 A1 | 6/2006 | Spiegel et al. | |
| 2006/0235754 A1 | 10/2006 | Walker et al. | |
| 2006/0293971 A1 | 12/2006 | Hunter et al. | |
| 2007/0168118 A1 | 7/2007 | Lappe et al. | |
| 2007/0185776 A1 | 8/2007 | Nguyen et al. | |
| 2007/0192111 A1 | 8/2007 | Chasen | |
| 2008/0052163 A1 | 2/2008 | Koh | |
| 2008/0275643 A1 | 11/2008 | Yaqub et al. | |
| 2009/0106124 A1 | 4/2009 | Yang | |
| 2009/0187488 A1 | 7/2009 | Shamilian | |
| 2009/0254445 A1 | 10/2009 | Bennett et al. | |
| 2009/0281903 A1 | 11/2009 | Blatstein | |
| 2009/0307096 A1 | 12/2009 | Antonellis | |
| 2010/0076853 A1 | 3/2010 | Schwarz | |
| 2010/0114790 A1 | 5/2010 | Strimling et al. | |
| 2011/0055046 A1 | 3/2011 | Bowen et al. | |
| 2012/0036028 A1 | 2/2012 | Webb | |
| 2012/0173308 A1 | 7/2012 | Brown et al. | |
| 2012/0173448 A1* | 7/2012 | Rademaker | G06Q 10/083 705/338 |
| 2012/0197722 A1 | 8/2012 | Mesaros | |
| 2012/0203619 A1 | 8/2012 | Lutnick et al. | |
| 2012/0303425 A1 | 11/2012 | Katzin et al. | |
| 2013/0006747 A1 | 1/2013 | Wu | |
| 2013/0046605 A1 | 2/2013 | Baron et al. | |
| 2013/0054323 A1 | 2/2013 | Charles | |
| 2013/0080204 A1 | 3/2013 | Khorashadi et al. | |
| 2013/0110396 A1 | 5/2013 | Choudhury | |
| 2013/0151357 A1 | 6/2013 | Havas et al. | |
| 2013/0218727 A1 | 8/2013 | Lutnick et al. | |
| 2013/0226651 A1 | 8/2013 | Napper | |
| 2013/0246207 A1 | 9/2013 | Novak et al. | |
| 2013/0253832 A1* | 9/2013 | Nallu | G01C 21/3667 701/538 |
| 2013/0290172 A1 | 10/2013 | Mashinsky | |
| 2013/0317940 A1 | 11/2013 | Fitz | |
| 2014/0011522 A1 | 1/2014 | Lin et al. | |
| 2014/0074743 A1* | 3/2014 | Rademaker | G06Q 30/0601 705/334 |
| 2014/0089135 A1 | 3/2014 | Linh et al. | |
| 2014/0095311 A1 | 4/2014 | Bulloch | |
| 2014/0164126 A1 | 6/2014 | Nicholas et al. | |
| 2014/0180953 A1 | 6/2014 | Westcott et al. | |
| 2014/0180959 A1 | 6/2014 | Gillen et al. | |
| 2014/0188637 A1 | 7/2014 | Balasubramaniam et al. | |
| 2014/0188650 A1 | 7/2014 | Sun et al. | |
| 2014/0214465 A1 | 7/2014 | L'Heureux et al. | |
| 2014/0222519 A1 | 8/2014 | Swinson et al. | |
| 2014/0226487 A1 | 8/2014 | Forssell et al. | |
| 2014/0279667 A1 | 9/2014 | Gillen | |
| 2014/0286150 A1 | 9/2014 | Miura | |
| 2014/0297470 A1 | 10/2014 | Ramadge et al. | |
| 2014/0310196 A1 | 10/2014 | Yamamura | |
| 2014/0343841 A1 | 11/2014 | Faaborg et al. | |
| 2014/0370167 A1 | 12/2014 | Garden | |
| 2015/0095122 A1 | 4/2015 | Eramian | |
| 2015/0178778 A1 | 6/2015 | Lee et al. | |
| 2015/0206093 A1 | 7/2015 | Trew et al. | |
| 2015/0227888 A1 | 8/2015 | Levanon et al. | |
| 2015/0227890 A1 | 8/2015 | Bednarek et al. | |
| 2015/0262121 A1 | 9/2015 | Riel-Dalpe et al. | |
| 2015/0269521 A1 | 9/2015 | Knapp et al. | |
| 2015/0286984 A1 | 10/2015 | Dikman et al. | |
| 2015/0294265 A1 | 10/2015 | Monteverde | |
| 2015/0324717 A1 | 11/2015 | Lord et al. | |
| 2015/0324729 A1 | 11/2015 | Lord et al. | |
| 2015/0332215 A1 | 11/2015 | Wilson et al. | |
| 2015/0371317 A1 | 12/2015 | Bosko et al. | |
| 2016/0019496 A1 | 1/2016 | Gorlin | |
| 2016/0048804 A1 | 2/2016 | Paul et al. | |
| 2016/0063438 A1 | 3/2016 | Shuken et al. | |
| 2016/0071050 A1 | 3/2016 | Kaye | |
| 2016/0171591 A1 | 6/2016 | Williams et al. | |
| 2016/0196525 A1 | 7/2016 | Kantor et al. | |
| 2016/0292664 A1 | 10/2016 | Gilfoyle | |
| 2018/0022405 A1 | 1/2018 | Gecchelin et al. | |
| 2018/0047242 A1 | 2/2018 | Lutnick et al. | |

OTHER PUBLICATIONS

Notice of Allowance dated Jun. 12, 2019, for U.S. Appl. No. 14/663,678, of Reiss, J.L., et al., filed Mar. 20, 2015.
Non Final Office Action dated Jul. 30, 2019, for U.S. Appl. No. 15/496,040, of Reiss, J.L., et al., filed Apr. 25, 2017.
Notice of Allowance dated Jun. 25, 2018, for U.S. Appl. No. 14/625,673, of Reiss, J.L., et al., filed Feb. 19, 2015.
Non-Final Office Action dated Jul. 13, 2018, for U.S. Appl. No. 14/710,808, of Reiss, J.L., et al., filed Oct. 29, 2015.
Final Office Action dated Jul. 23, 2018, for U.S. Appl. No. 14/663,678, of Reiss, J.L., et al., filed Mar. 20, 2015.
Notice of Allowance dated Sep. 6, 2018, for U.S. Appl. No. 14/993,149, of Kohli, A., et al., filed Jan. 12, 2016.
Final Office Action dated Nov. 16, 2018, for U.S. Appl. No. 14/813,358, of Kohli, A., filed Jul. 30, 2015.
Non Final Office Action dated Dec. 17, 2018, for U.S. Appl. No. 14/663,678, of Reiss, J.L., et al., filed Mar. 20, 2015.
Advisory Action dated Jan. 29, 2019, for U.S. Appl. No. 14/926,056, of Bernstein, B.R., et al., filed Oct. 29, 2015.
Notice of Allowance dated Feb. 25, 2019, for U.S. Appl. No. 14/710,808 of Reiss, J.L et al., filed May 13, 2015.
EIC 3600 Search Report dated Feb. 25, 2019, for U.S. Appl. No. 14/710,808, of Reiss, JL et al., filed May 13, 2015.
Non-Final Office Action dated Apr. 4, 2019, for U.S. Appl. No. 14/813,358, of Kohli, A, filed Jul. 30, 2015.
Non-FinalOffice Action dated Feb. 1, 2018, for U.S. Appl. No. 14/993,149, of Kohli, A., et al., filed Jan. 12, 2016.
Non Final Office Action dated Feb. 28, 2018, for U.S. Appl. No. 14/642,875, of Reiss, J.L., et al., filed Mar. 10, 2015.
Non Final Office Action dated Mar. 8, 2018, for U.S. Appl. No. 14/663,678, of Reiss, J.L., et al., filed Mar. 20, 2015.
Non-FinalOffice Action dated Jan. 11, 2018, for U.S. Appl. No. 14/625,683, of Kumar, Ar., et al., filed Feb. 19, 2015.
Non-Final Office Action dated Jan. 12, 2018, for U.S. Appl. No. 14/813,358, of Kohli, A., filed Jul. 30, 2015.
Non-Final Office Action dated Jan. 18, 2018, for U.S. Appl. No. 14/985,267, of Rhodes, M., et al., filed Dec. 30, 2015.
Non-Final Office Action dated Jan. 26, 2018, for U.S. Appl. No. 14/838,446, of Kohli, A., filed Aug. 28, 2015.
Non-Final Office Action dated Nov. 9, 2017, for U.S. Appl. No. 14/625,673, of Reiss, J.L., et al., filed Feb. 19, 2015.
Horn, L., "Groupon Now Provides Instant Location Based Deals," PC Magazine Online, dated May 11, 2011, ProQuest Dialog,

(56) References Cited

OTHER PUBLICATIONS

Retrieved from the Internet URL: hllp://search.proquest.com/professional/docview/1092618010?accountid=161862, on Nov. 2, 2015, pp. 1-2.

Kauffman, R.J., and Wang, B., "Bid Together, Buy Together: On the Efficacy of Group-Buying Business Models in Internet Based Selling," Carlson School of Management, last revised on May 16, 2001, pp. 1-44.

Non-Final Office Action dated May 26, 2015, for U.S. Appl. No. 14/625,680, of Kumar, A.R., et al., filed Feb. 19, 2015.

Non-Final Office Action dated Jun. 24, 2015, in U.S. Appl. No. 14/663,671, of Reiss, J.L., et al., filed on Mar. 20, 2015.

Notice of Allowance dated Nov. 6, 2015, for U.S. Appl. No. 14/625,680, of Kumar, A.R., et al., filed Feb. 19, 2015.

Final Office Action dated Dec. 24, 2015, in U.S. Appl. No. 14/663,671, of Reiss, J.L., et al., filed Mar. 20, 2015.

Avisory Action dated Mar. 9, 2016, in U.S. Appl. No. 14/663,671, of Reiss, J.L., et al., filed Mar. 20, 2015.

Non-Final Office Action dated Oct. 6, 2016, for U.S. Appl. No. 14/663,671, of Reiss, J.L., et al., filed Mar. 20, 2015.

Notice of Allowance dated Dec. 22, 2016, for U.S. Appl. No. 14/663,671, of Reiss, J.L., et al., filed Mar. 20, 2015.

\* cited by examiner

DETERMINING USER INTERFACE INFORMATION BASED ON LOCATION INFORMATION

CROSS-REFERENCE TO RELATED APPLICATION

This application is a continuation of, and claims priority to, U.S. patent application Ser. No. 14/926,056, filed Oct. 29, 2015, and which is incorporated by reference herein.

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. Conventionally, when a customer wants to order from multiple restaurants, the customer might place a first order with a first restaurant, such as for having a pizza delivered, and might also place a second order with a second restaurant, such as for having Chinese food delivered. This can result in duplication of delivery services and additional cost to the customer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
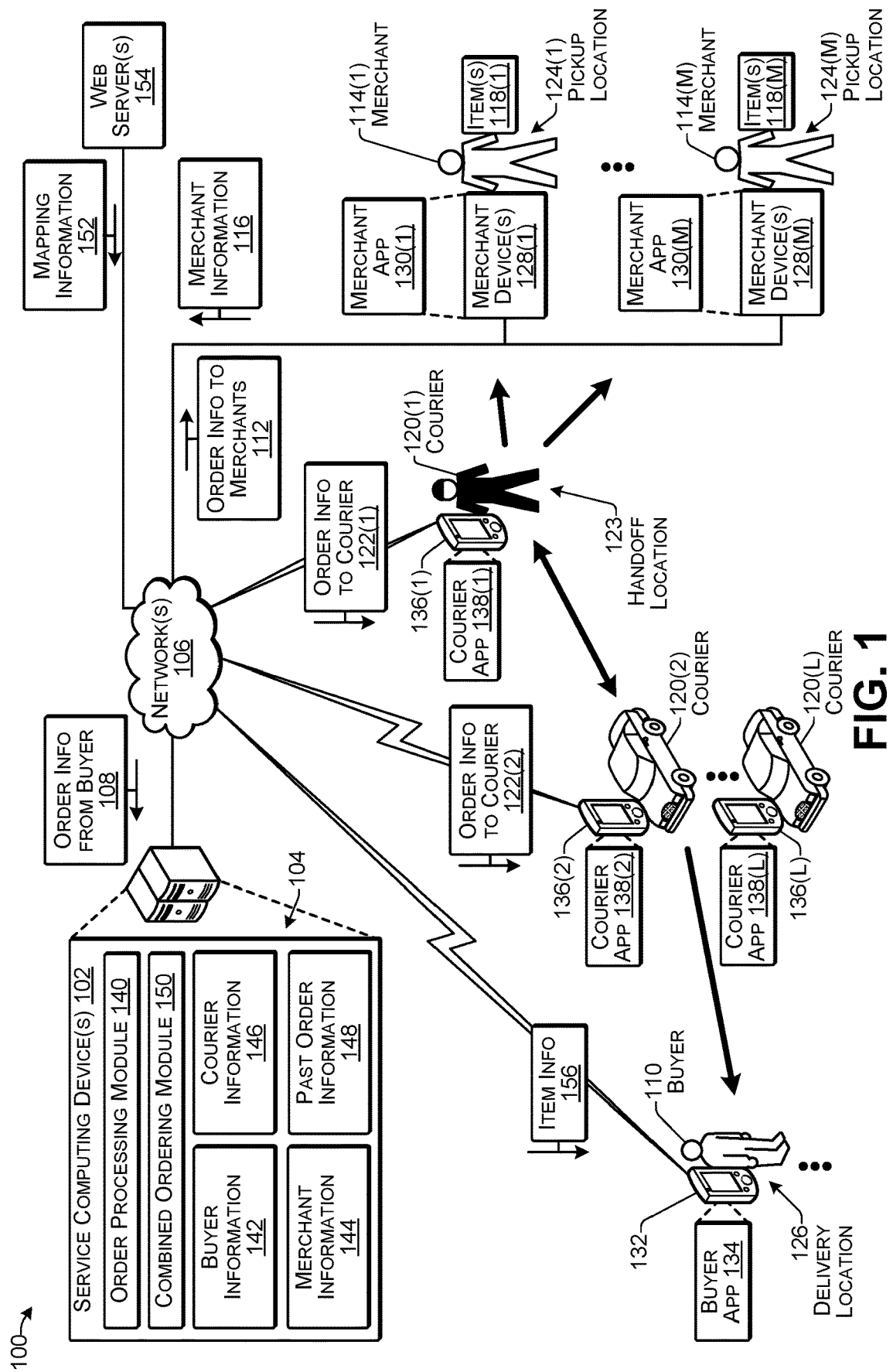
FIG. 1 illustrates an example system enabling ordering from multiple merchants for combined delivery according to some implementations.

The technology herein includes novel arrangements and techniques for enabling buyers to place orders for items from multiple merchants for combined delivery. For instance, a service provider may determine that multiple merchants are within a threshold distance of each other. Based on this determination, the service provider may send, to a buyer, item information about items offered by the multiple merchants. Based at least in part on the multiple merchants having been determined to be within the threshold distance of each other, the item information sent to the buyer may indicate that orders for items provided by the multiple merchants are available for combined delivery, e.g., as a single combined order delivered together.

A buyer device may present a graphic user interface (GUI) that includes the information about the items available to be ordered from the multiple merchants for inclusion in the same delivery order. For example, the GUI may identify merchants that are in the same combined ordering group so that the buyer is able to combine items from these merchants as desired when creating an order to have the items delivered together. Thus, the buyer is able to select a combination of items from different merchants in a single order that is delivered together in the same delivery, which may eliminate additional delivery fees, duplication of services, and the like.

In some cases, preparation of items being prepared by different merchants for the same order may be coordinated to be completed by the respective merchants at approximately the same time so that the items for the order are fresh when picked up by the courier. For instance, the service provider may receive, from each merchant device, an indication of a current load on the merchant, such as the number of orders that the merchant is currently preparing or will be preparing in the near future. As an example, the service provider may receive an indication of a total number of orders that have been received by the merchant, including delivery orders, walk-in orders, or other types of orders. Thus, when determining the preparation times for the ordered items, the service provider may take into consideration the current load on each of the merchants. The service provider may use this information to predict preparation times for each item ordered, and to provide a target pickup time to each merchant for each item being prepared by that merchant. Accordingly, pickup times of items can be coordinated so that a first item prepared by a first merchant does not spoil while a second item in the order is still being prepared by a second merchant, or vice versa.

As one example, the service provider may receive, from the buyer device, an order for a first item offered by a first merchant and a second item offered by a second merchant of the multiple merchants in the combined ordering group. The service provider may determine a predicted first preparation time for the first item and a predicted second preparation time for the second item. Based on the first item having a longer predicted preparation time than the second item, the service provider may send, to the first merchant, a requested pickup time for the first item, which may be based on the current time plus the predicted preparation time for the first item. In response to receiving confirmation of the first pickup time or a revised first pickup time from the first merchant if the preparation will take substantially longer or shorter than predicted, the service provider may send to the second merchant a requested second preparation time for the second item, which may be based on the first pickup time information received from the first merchant, i.e., the requested first pickup time or the revised first pickup time. The service provider may receive a confirmation of the second pickup time or a revised second pickup time for the second item from the second merchant. If the revised second pickup time indicated by the second merchant exceeds the first pickup time by a threshold amount, the service provider may send an updated first pickup time to the first merchant, such as for pushing back the preparation of the first item so that the pickup time for the first item can approximately coincide with the pickup time for the second item.

Based on the confirmation information received from the first merchant and the second merchant, the service provider knows when the first item and second item will be ready for pick up. The service provider may send, to a first courier device associated with a first courier, order information to enable the first courier to pick up the first item from the first merchant and the second item from the second merchant. For instance, the service provider may station the first courier at or near to a handoff location so that the first courier can pick up items from the merchants and deliver the items to other couriers at the handoff location. The service provider may also send order information to a second courier who will pick up the ordered items at the handoff location and deliver the ordered items to the buyer at the delivery location specified by the buyer. In some examples, rather than being in the same fixed location every day, the handoff location may be established temporarily based on the GPS location of the first courier. Thus, the handoff location may not be a stationary geographic point, but may be changed as the location of the first courier changes, such as based on current conditions in the area of the group of merchants. In this case, the service provider may receive location information from the first courier device and instruct the second courier on where to pick up the items from the first courier.

In some cases, the service provider may use clustering techniques to determine a group of merchants who have pickup locations that are within a threshold distance of each other. As one example, the threshold distance may be determined based on a courier being able to pick up items at multiple merchant locations within a short period of time, such as less than 5 minutes. Further, in some examples, a centroid of the cluster may be determined and a recommended handoff location may be determined based in part on the centroid location, while also taking into consideration other factors such as accessibility by the other courier(s) who will deliver the items to the buyers.

In addition, in some cases, one or more additional couriers may be utilized. For instance, a first courier may act as a runner between the merchants and the handoff location, while a third courier may remain at the handoff location to receive the ordered items from the first courier. The third courier may ensure that orders are complete, may package and label orders, and may handoff the ordered items to second couriers who will deliver the ordered items to the buyers.

Furthermore, as another example, a first item may be ordered from a first merchant by a first buyer for delivery to a first delivery location, and contemporaneously, a second item may be ordered from a second merchant by a second buyer for delivery to a second delivery location. For example, the service provider may instruct at least one of the merchants to time the preparation of the respective items so that a courier is able to pick up the items at approximately the same pickup time. Thus, a courier may pick up the first item and the second item from the merchants and may transport the items together to the handoff location.

In some cases, the courier who picked up the items may be stationed at the handoff location, while in other cases, another courier may be stationed at the handoff location (i.e., the third courier discussed above). If the buyer delivery locations are within a threshold proximity of each other, a single second courier may pick up the first item and the second item from the handoff location and may deliver the items to the first delivery location and the second delivery location, respectively. Alternatively, if the respective delivery locations are not within the threshold proximity of each other (e.g., more than 5-10 minutes of courier travel time apart), one second courier may deliver the first item, and another second courier may deliver the second item.

Accordingly, some implementations herein enable the creation of a synthetic combined restaurant by establishing a handoff location at any location where there is a cluster of merchants within a threshold distance of each other. The technology herein provides a novel system and environment in which buyers are able to order items from two or more different merchants and have the items delivered together as a combined order, such as without incurring any additional delivery charge for ordering from multiple merchants. As one example, the buyer may be able to order items from any merchants in a group of merchants that are within a threshold distance of each other. As another example, multiple different buyers may order respective different items from different merchants and the transport of the different items may be combined by the service provider to increase delivery efficiency and reduce delivery costs. Thus, the techniques herein may be used to dynamically and/or spontaneously create a conglomerate merchant from a group of otherwise disparate merchants, and may enable buyers to select items from any combination of the merchants in the group for creating a combined order. Further, the service provider may be able to combine separately received orders dynamically, as the orders are received, for enabling combined pickup and/or combined transport.

Additionally, some implementations herein provide technological innovations that enable people to participate as couriers in a new type of crowdsourced service economy. With the technology herein, essentially any person with a mobile device is able to immediately become a courier, or cease to be a courier, in a courier network that provides delivery services for delivery of items from merchants to buyers. Further, through the interaction of the plurality of computing devices, mobile devices, and location sensors, implementations herein are able to determine the locations of merchants and/or track the movement of couriers throughout a service region over time, and can use this information to assist in predicting courier travel times, such as to various delivery locations.

As used herein, an order may include a request submitted by a buyer for the acquisition of food items and/or other goods (referred to herein as items) from a merchant. Further, a merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service may receive payment from a buyer for an order and the service may provide payment to the merchant for the order. Further, the service may provide payment to the courier for delivering the order.

For discussion purposes, some example implementations are described in the environment of enabling buyers to place orders for items from multiple merchants for delivery together as a single delivery. However, implementations herein are not limited to the particular examples provided, and may be extended to other service environments, other system architectures, other types of goods, other courier arrangements, and so forth, as will be apparent to those of skill in the art in light of the disclosure herein.

FIG. 1 illustrates an example system 100 enabling a delivery order from multiple merchants according to some implementations. The system 100 includes one or more service computing devices 102 of a service provider 104 that may receive, over one or more networks 106, order information 108 from at least one buyer 110. For instance, while a single buyer 110 is shown for clarity in this example, a large number of buyers 110 may use the system 100 for placing delivery orders. Thus, the order information 108 may include information about at least one order placed by at least one buyer 110. Based on the order information 108 received from a particular buyer 110, the service computing device 102 may send order information 112 to particular merchants 114 of a plurality of merchants 114(1)-114(M). For example, the buyer 110 may be able to order from multiple selected merchants as a single order. Each selected merchant 114 may receive at least a designated portion the order information 112 and may respond with merchant information 116. For instance, the merchant information 116 from each selected merchant 114 may include confirmation information to confirm that the particular order has been received and will be prepared by the responding merchant 114.

The order information 112 sent to each merchant 114 may identify one or more items 118 ordered by the buyer 110 from the selected merchant 114. For instance, each merchant 114(1)-114(M) may offer one or more respective items 118(1)-118(M), which may be ordered by the buyer 110 for delivery. In some cases, the order information 112 may also specify a time at which the order is to be picked up by a first courier 120(1) of a plurality of couriers 120(1), 120(2), . . . , 120(L). For instance, the service provider 104 may predict the preparation time for each item 118 included in the order. The merchant information 116 sent by each merchant 114 to the service computing device 102 may confirm that a respective item will be ready by the respective pickup time specified by the service computing device 102, or may provide a revised pickup time. In some cases, based on the predicted preparation time for a first item being prepared by a first merchant, the service provider may request that a second merchant delay the preparation of a second item so that the pickup times for the first and second items may be closer together, e.g., approximately the same time. Alternatively, in other examples, the order information 112 sent to the merchant 114 may include an inquiry as to when the ordered item 118 will be prepared and ready for pick up, and the merchant 114 may include with the merchant information 116 a specified time at which the order will be ready for pickup.

In response to receiving the merchant information 116 from the particular merchant 114, the service computing device 102 may send first order information 122(1) to the first courier 120(1) who will pick up the ordered items from the selected merchants 114. The service computing device 102 may further send second order information 122(2) to a second courier 120(2) who will pick up the ordered items from the first courier 120(1) at a handoff location 123 and deliver the ordered items to the buyer 110 who placed the order. For instance, each merchant 114(1)-114(M) may be associated with a respective merchant pickup location 124 (1)-124(M), which may typically be the merchant's place of business. Furthermore, each buyer 110 may be associated with a respective delivery location 126 to which the order is to be delivered.

In some examples, the service provider 104 may determine subsets of the merchants 114(1)-114(M) as combined ordering groups from whom the buyer 110 is able to order items as a single order. For instance, as discussed additionally below, the service provider 104 may use clustering techniques or other techniques to determine a group of the merchants that are within a threshold distance of each other. For instance, the service provider 104 may identify the group of merchants that are within a threshold distance of each other, and may station the first courier 120(1) at a handoff location 123 close to or within the group. When a buyer orders items 118 from multiple merchants 114 in the group, the first courier 120(1) may pick up the ordered items 118 from these merchants 114 for the particular order and return to the handoff location 123. The second courier 120(2) may pick up the items 118 for the particular order at the handoff location 123 and may deliver the ordered items 118 together as a single delivery to the buyer 110 at the delivery location 126.

The first order information 122(1) sent to the first courier 120(1) may include the pickup location 124 of each merchant 114 that is preparing an item for the order, and the respective pickup time at which the first courier is to pick up each item from each merchant 114. The order information 122(2) sent to the second courier 120(2) may include the handoff location 123 for the order, the handoff time, i.e., the time at which the first courier is expected to arrive at the handoff location with the order, and the delivery location 126 for the order. In some examples, the order information 122(2) may further include a contract time, i.e., a delivery time by which the service provider 104 has agreed to have the ordered items 118 delivered to the buyer 110 at the delivery location 126.

In the illustrated example, the service computing device 102 of the service provider 104 is able to communicate with merchant devices 128(1)-128(M) over the one or more networks 106. Each merchant device 128(1)-128(M) may be associated with a respective merchant 114(1)-114(M). Each merchant device 128(1)-128(M) may be a computing device, such as a desktop, laptop, tablet, smart phone, or the like, and may include a respective instance of a merchant application 130(1)-130(M) that executes on the respective merchant device 128(1)-128(M). For example, the merchant application 130 may be configured to communicate with the service computing device 102, such as for receiving the order information 112 and for sending the merchant information 116. In some examples, the merchant application 130 and the service computing device 102 may communicate with each other via one or more application programming interfaces (APIs).

Further, the merchant device 128 may include one or more output devices, such as speakers (not shown in FIG. 1), that the merchant application 130 may use to audibly notify the respective merchant 114 that an order has been received. Additionally, or alternatively, the merchant device 128 may include a display (not shown in FIG. 1) that the merchant application 130 may use for presenting the order information 112 to the merchant 114. For instance, the merchant application 130 on the merchant device 128 may present the order information 112 in one or more graphic user interfaces (GUIs).

In some examples, the merchant application 130 may provide point-of-sale (POS) functionality to the merchant device 128 to enable the merchant 114 to accept payments from walk-in/walk-up customers using the merchant device 128. Alternatively, in some examples, the merchant device 128 may include a fax machine and the merchant 114 may receive the order information 112 via a facsimile transmission from the service computing device 102. As still another example, the merchant device 128 may include a computing device that is configured to receive order information via email, instant messaging, or other electronic communication. As still another example, the merchant device 128 may include a phone, and the merchant device 128 may receive the order information 112 via an SMS text message, voicemail, telephone call, or the like.

In some examples, the merchant application 130 may keep track of orders received by the respective merchant 114. For example, the merchant 114 may receive orders for delivery from the service computing device 102. The merchant 114 also may receive orders from customers who walk in or walk up to the merchant's place of business and/or place orders to eat in or carry out. Thus, the merchant information 116 sent to the service computing device 102 may indicate a current load for each merchant 114 based on the number of orders received by the merchant 114 over any given time. The service computing device 102 may use this merchant load information when calculating preparation times for ordered items.

In addition, in some cases, the merchant information 116 may include inventory information for the respective merchant. For instance, if a particular merchant is out of a particular item, the item information sent to the buyers may exclude any items that are not currently in inventory and/or indicate that these items are not currently available for ordering.

In addition, the buyer 110 may be associated with a buyer device 132 that may execute a respective instance of a buyer application 134. For example, the buyer 110 may use the buyer device 132, such as a smart phone, tablet computer, wearable computing device, laptop, desktop, or the like, and the buyer device 132 may have installed thereon the buyer application 134. The buyer application 134 may enable the buyer 110 to select one or more of the items 118 to purchase from one or more of the merchants 114 to be delivered to the buyer 110 by one or more of the couriers 120. For example, the buyer application 134 may present one or more GUIs on a display for enabling the buyer 110 to select one or more of the items 118 for an order.

In some cases, the delivery location 126 of the buyer 110 may be determined by a GPS (Global Positioning System) receiver (not shown in FIG. 1) or other location sensor onboard the buyer device 132. This location information may be transmitted to the service computing device as the indicated delivery location 126. Thus, the system 100 may employ a plurality of computing devices, mobile devices, and location sensors to provide a novel technological arrangement that provides buyers varying options for ordering items from one or more merchants, as discussed additionally below.

Further, the buyer application 134 may enable the buyer 110 to place an order from one or more merchants 114 in advance, such as for scheduling an order for delivery at a later time on the same day, at a specified time on a future day, or the like. For instance, the buyer 110 may be able to place an order through the buyer application 134 to have lunch delivered at a specified delivery location by a specified time on a specified day.

The buyer application 134 may further enable the buyer 110 to make a payment for an order for items from multiple merchants as a single transaction using the buyer application 134. For instance, the service provider 104 may charge a buyer account associated with the buyer 110 for an amount associated with a particular order. In some examples, the buyer application 134 and the service computing device 102 may communicate with each other via one or more APIs. Additionally, or alternatively, the buyer application 134 may be a web browser, or the like, and the buyer 110 may navigate to a website associated with the service provider 104, and may use the website associated with the service provider 104 to place an order. In this case, the website may provide at least some of the functionality attributed to the buyer application 134 herein.

In addition, the couriers 120(1)-120(L) may be associated with respective courier devices 136(1)-136(L) that may execute respective instances of courier applications 138(1)-138(L). For example, couriers 120 may use courier devices 136, such as smart phones, tablet computers, wearable computing devices, laptops, or the like, and these courier devices 136 may have installed thereon the courier application 138. The courier application 138 may be configured to receive the order information 122 from the service computing device 102 to provide a particular courier 120 with information for picking up a particular order from a merchant's pickup location 124 or the handoff location 123. The courier application 138 may further enable the courier 120 to respond to the service computing device 102 to confirm receipt of order information 122.

Additionally, in some cases, the courier application 138 may provide the service computing device 102 with an indication of a current location of a particular courier 120. For instance, one or more location sensors associated with each courier device 136 of an active courier 120 may provide location information and, based on this, the courier application 138 may send location information to the service computing device 102, such as by providing an indication of a geographic location of each courier device of each active courier. Thus, a subset of courier devices 136 associated with active couriers may communicate with the service computing device 102, and may send location information obtained from one or more location sensors associated with each courier device 136, such as a GPS receiver (not shown in FIG. 1).

In some cases, another subset of courier devices 136 associated with the inactive couriers may be periodically pinged by the service computing device 102 to determine interest in becoming active and, if so, requesting current location information of the associated inactive courier. Couriers who are interested in being activated may allow their courier devices 136 to respond with their location information, while those who are not interested in being activated may keep their location information private by not responding. In some examples, the courier application 138 and the service computing device 102 may communicate with each other via one or more APIs. Alternatively, in other examples, the courier device 136 may receive the order information 122 via an SMS text message, a voicemail, a telephone call, or the like.

The one or more networks 106 can include any appropriate network, including a wide area network, such as the Internet; a local area network, such an intranet; a wireless network, such as a cellular network, a local wireless network, such as Wi-Fi and/or short-range wireless communications, such as BLUETOOTH® and BLUETOOTH® low energy; a wired network, including fiber optics and Ethernet; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 128, the buyer devices 132, and/or the courier devices 136 are able to communicate over the one or more networks 106 using wired or wireless connections, and combinations thereof.

In the illustrated example, the service computing device 102 includes an order processing module 140 that may be executed on the service computing device 102 to provide, at least in part, the order processing functionality attributed to the service computing device 102. The order processing module 140 may receive the order information 108 from the buyers 110 and may associate the order information 108 with buyer information 142 and merchant information 144. For instance, based on buyer identifying information that may be included with the order information 108, the order processing module 140 may associate particular order information 108 with a particular buyer account. The order processing module 140 may access a buyer account included in the buyer information 142 to charge a particular buyer account for a particular order.

Furthermore, based on a particular merchant 114 identified by the order information 108, the order processing module 140 may associate the order information 108 with a merchant account of a particular merchant 114. The order processing module 140 may access the merchant account, which may be identified in the merchant information 144, to determine contact information for sending the order information 112 to the correct merchant device 128 so that the particular merchant 114 can receive and provide confirmation of the order. The order processing module 140 may further access the merchant account of the particular merchant 114 to credit payment to the particular merchant that prepares the order.

In addition, the order processing module 140 may access courier information 146 to determine courier contact information for sending the order information 122 to particular couriers 120(1) and 120(2) of the plurality of couriers 120(1)-120(L). The particular couriers 120(1) and 120(2) may use the courier application 138 on their respective courier devices 136 to receive a respective message with information about the order, and to respond with acceptance if the job assignment is accepted. The first courier 120(1) may subsequently pick up the ordered items from the respective merchants 114. For example, the first courier may be stationed or otherwise instructed to attend the handoff location 123, such as for picking up orders from the merchants and returning to the handoff location 123 to meet the second courier 120(2).

As one non-limiting example, the group of merchants may be a plurality of food trucks, such as at a food truck fair or food truck hub, may be merchants having stands at a food festival, and so forth. Thus, in some cases, the merchants may be mobile or semi-mobile, and may be at a location temporarily. In other examples, the merchants may be stationary and may be at a permanent location. In some instances, in the case that the merchants are mobile, the handoff location may be established based on a geographic location of the first courier. As one example, the first courier may set up a stand or the like to enable other couriers to easily locate the handoff location 123. Thus, merchant combined ordering group and the handoff location may be created temporarily and spontaneously, and may change periodically, day-to-day, or the like. In other examples, the group of merchants may include a food court, a closely clustered group of independent merchants, such as within a neighborhood block, or the like.

The second courier 120(2) may pick up the ordered items from the first courier 120(1) at the handoff location 123 and deliver the ordered items to the particular buyer 110 at a specified delivery location 126. When the second courier 120(2) has completed delivery of the ordered items to the delivery location 126, the second courier 120(2) may use the courier application 138 to inform the order processing module 140 that the delivery has been completed. The order processing module 140 may access a courier account included in courier information 146 for the second courier 120(2) to credit the courier account of the second courier 120(2) with payment for the delivery job. Similarly, the courier account of the first courier 120(1) may also be compensated on a per-order basis or by any other payment technique.

The order processing module 140 may store information associated with each order as past order information 148. For instance the past order information 148 may include a day of the week, date, and time of day at which each order is received from the respective buyer 110. The past order information 148 may further include, for each order: merchant identifying information; buyer identifying information; items ordered; the pickup location 124; the handoff location 123, the delivery location 126; preparation time for each item in the order; location of the first courier 120(1) when the first courier received the order; location of the second courier 120(2) when the second courier 120(2) accepted the job for delivery of the order; predicted spoilage time for one or more items; time that the ordered items were picked up by the first courier and handed off to the second courier; time that the order was delivered; amount paid for the order; feedback including records of any complaints or indications of spoilage; as well as other information, as discussed additionally below.

The service computing device 102 may further include a combined ordering module 150 that may be executed by the service computing device 102 to determine merchants 114 who are within a threshold distance of each other and/or a potential handoff location 123. For example, the combined ordering module 150 may use clustering techniques or other suitable algorithms for determining a combined ordering group of merchants from whom buyers may combine orders by ordering items from multiple merchants in the group.

As discussed additionally below, the combined ordering module 150 may determine distances between pickup locations of a plurality of merchants, and may identify a cluster of merchants based on the distances being less than a threshold distance. For instance, the combined ordering module 150 may receive or otherwise access mapping information 152, such as from a web server 154, an internal database (not shown), or the like, to determine relative distances between the pickup locations of the merchants. Furthermore, the combined ordering module 150 may determine a centroid of the cluster, and may recommend that a handoff location 123 be established based on the centroid, such as near to the centroid or near to a suitable location determined based on the centroid as well as other considerations. For instance, it may be desirable for the handoff location 123 to be easily accessible by other couriers while also being in a location that does not block traffic, pedestrians, or the like.

When a group of merchants for combined ordering has been identified, the combined ordering module 150 may send item information 156 to the buyer application 134 to indicate that items from the merchants in the combined ordering group may be combined in a single order, such as without incurring additional delivery charges, or the like. The buyer application 134 may receive the item information 156, and may present this information to the buyer in a GUI with an indication that combined ordering is available for the merchants in the identified group.

In addition, in response to receiving an order from the buyer 110 for items from multiple merchants in a combined ordering group, the combined ordering module 150 may predict preparation times for each of the ordered items so as to attempt to time the pickup times for the items to be close to each other or otherwise approximately the same time. As one example, suppose that the buyer 110 orders a pizza from a first merchant, and French fries from a second merchant, and that the preparation time for the pizza is predicted to be 15 minutes while the preparation time for the French fries is predicted to be 4 minutes. Furthermore, suppose that the courier travel time between the first merchant pickup location and the second pickup merchant pickup location is less than one minute. Accordingly, the combined ordering module 150 may send order information to the first merchant with the order for the pizza and request confirmation that the pizza will be ready to be picked up in 15 minutes. In response to receiving confirmation from the first merchant that the pizza will be ready in 15 minutes, the combined ordering module 150 may send order information 112 to the second merchant instructing the second merchant to prepare the French fries for pickup in 15 minutes, rather than right away, and delaying the start of the preparation of the French fries by approximately 10 minutes. Consequently, implementations herein may predict the preparation times for ordered items so that items combined in the same order may have approximately the same pickup times, thereby ensuring greater freshness for the items provided to the buyer and reducing the chances of spoilage.

In some examples, the combined ordering module 150 may determine predicted preparation times for the ordered items based on the past order information 148 and/or based on the merchant information 116 received from the merchant device 128. For instance, as mentioned above, the combined ordering module 150 may determine the predicted preparation time for the first item from past order information 148 that indicates how long the first merchant 114 has taken to prepare similar items in the past. In some examples, the merchant information 116 may include an indication of a current load on the merchant (e.g., a number of orders received and still to be prepared by a particular merchant), and this load information may be used when determining the predicted preparation times by determining past preparation times for the item under similar past loads for the merchant. Thus, the combined ordering module 150 may determine, for a plurality of different times of day for a plurality of different days, and for a plurality of orders received for items over a past period of time, e.g., a past month, past two months, past year, etc., the actual preparation times for particular items offered by each merchant 114 in the combined ordering group.

Further, the combined ordering module 150 may receive an indication of a current load on the particular merchant based on not only delivery orders received by the particular merchant but also on walk-in/walk-up orders or other types of orders received by the particular merchant and still to be prepared. For example, if the particular merchant is currently very busy, the preparation times for the items being prepared by the merchant may be predicted to be longer than if the merchant is not very busy. Accordingly, the merchant information 116 received from the merchant device 128 may indicate a current number of orders of all types that the particular merchant 114 has received. Comparing this merchant load information with the past order information 148, such as past preparation times for particular items when the merchant load was similar, may be used to provide an indication of the predicted preparation times for each of the items available from the particular merchant 114.

Additionally, or alternatively, the merchant information 116 provided to the service computing device 102 from the merchant device 128 may include a predicted preparation time for an ordered item, as determined by the merchant who will be preparing the item. For instance, if the prediction by the merchant is different from the prediction determined from the past order information or other techniques, the combined ordering module 150 may give priority to the predicted preparation time indicated by the merchant. The combined ordering module 150 may then use this predicted preparation time when requesting a pickup time for a second item from a second merchant.

As one example, when receiving an order that combines multiple items from multiple merchants, the combined ordering module 150 may determine a first item in the order that is predicted to have the longest preparation time. The combined ordering module 150 may request confirmation from the first merchant of a pickup time for the first item based on the predicted preparation time before sending the order information for the second item to the second merchant. Subsequently, after receiving confirmation of the first pickup time from the first merchant, the combined ordering module 150 may send the order for the second item to the second merchant and may request a particular pickup time for the second item from the second merchant based on the first pickup time for the first item. Similarly, if a third merchant will be preparing a third item having a shorter predicted preparation time than the second item, the order information for the third item with a requested third pickup time may be sent to the third merchant in turn after receiving confirmation of the requested second pickup time from the second merchant. If the second merchant is not able to meet the requested pickup time by more than a threshold amount of time, the combined ordering module 150 may ask the first merchant to push back the preparation of the first item by the amount of time that the preparation of the second item will be delayed.

Alternatively, in other examples, an entire order may be sent to each merchant having at least one item in the order. Based on this technique, each merchant may then discern which items the merchant is responsible for preparing, and may prepare the respective items accordingly. Further, as another alternative, one or more merchants might not have respective merchant devices that receive the order information, and instead a courier may manually deliver the respective orders to each of these merchants with whom an order has been placed.

Further, if a particular merchant has run out of a particular item, this may be indicated by merchant inventory information received with the merchant information 116 from the particular merchant. Accordingly, the service provider 104 may not include that particular item in the item information 156 sent to the buyer device, or may otherwise indicate the particular item to be unavailable. For instance, the service provider may receive inventory information from the merchant device on a regular basis, such as when any inventory item is getting low or is fully depleted. In some cases, the service provider 104 may also perform a wholesale ordering function on behalf of particular merchants 114 to restock certain items when the inventory for those items falls below a threshold level. In some examples, the service provider 104 may determine that the inventory for an item is above a threshold level (e.g., greater than or equal to one) before sending information about the item with the item information 156 sent to a buyer device.

Alternatively, rather than providing inventory information to the service provider, the merchant may manually indicate that an item is unavailable. For example, when the merchant has run out of a particular item, the merchant may send a notification to the service provider to notify the service provider that the item is no longer available. If a buyer has placed an order for the particular item, the service provider may notify the buyer that a portion of the buyer's order is no longer available. Further, the service provider may update the item information sent to the buyer devices to remove the particular item or to otherwise indicate that the particular item is not currently available.

In addition, as another example, a first buyer 110 may order a first item 118 from a first merchant 114 for delivery to a first delivery location 126, and a second buyer 110 may order a second item 118 from a second merchant 114 for delivery to a second delivery location 126. The first merchant and the second merchant may be part of a combined ordering group of merchants that have been determined to be within a threshold distance of the each other. Further, the combined ordering module 150 may determine that the preparation of the first item and the preparation of the second item can be timed so that pick up of the items and/or delivery of the items can be performed by a single courier.

As one example, the service provider may instruct the first merchant and/or the second merchant to time the preparation of the respective first item and/or second item so that a courier may pick up the items at approximately the same pickup time. Thus, a first courier 120(1) may pick up the first item and the second item from the respective merchants and may transport the items together to the handoff location 123. In some cases, the first courier 120(1) who picked up the items may be stationed at the handoff location 123, while in other examples another courier may be stationed at the handoff location (not shown in FIG. 1).

If the buyer delivery locations 126 are within a threshold proximity of each other, a single second courier 120(2) may pick up the first item and the second item from the handoff location 123, and may deliver the items to the first delivery location and the second delivery location, respectively. Alternatively, if the delivery locations are not within the threshold proximity of each other (e.g., more than 5-10 minutes of courier travel time apart from each other) one second courier may deliver the first item, and another second courier may deliver the second item. Additionally, as another alternative, two different couriers may pick up the items from the two different merchants and transport the items to the handoff location 123, and a single second courier may pick up the items from the handoff location and deliver the items to the respective delivery locations if the respective delivery locations are within the threshold proximity of each other.

Figure 2:
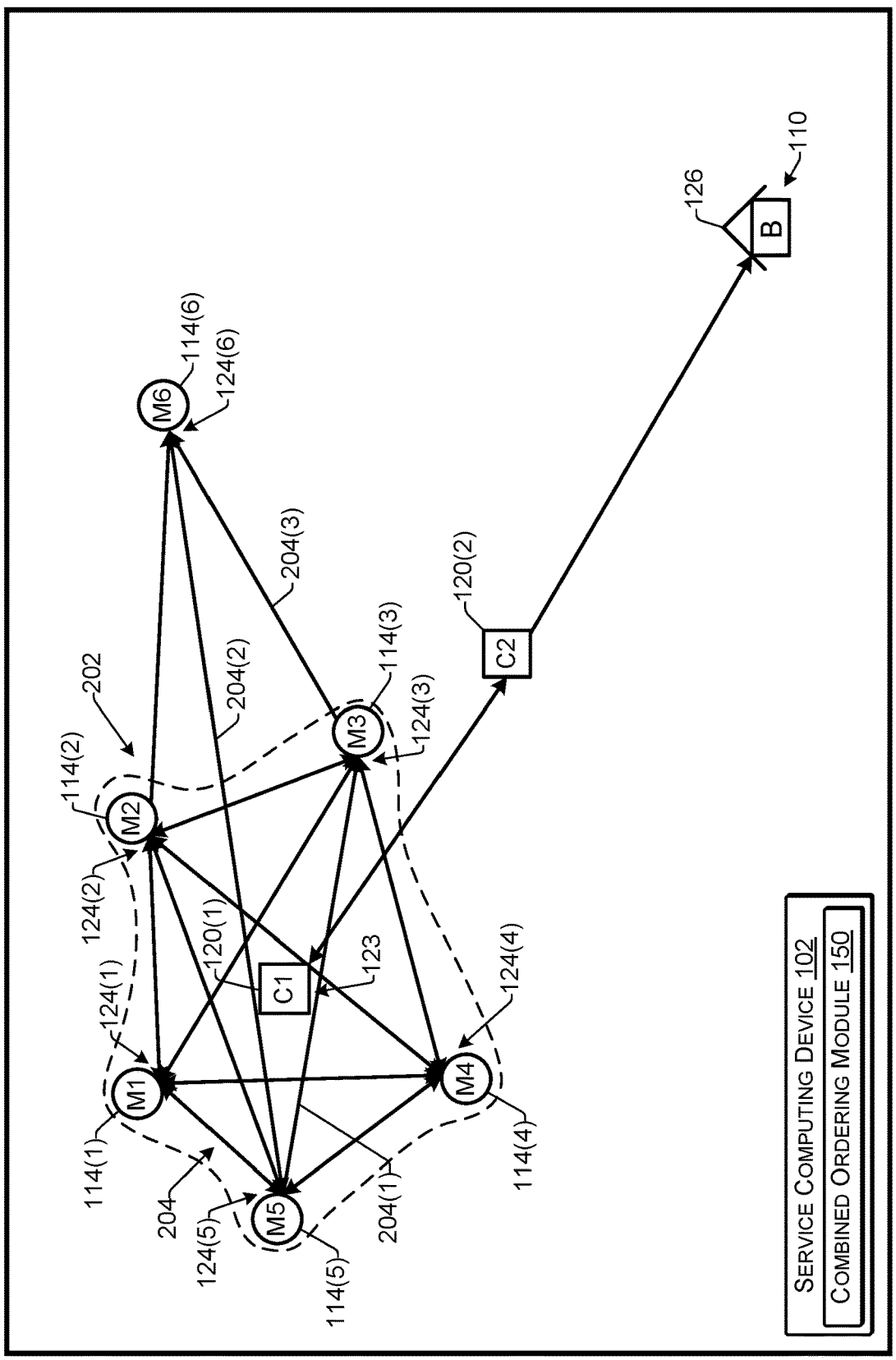
FIG. 2 illustrates an example of determining a group of multiple merchants for combined order deliveries according to some implementations.

FIG. 2 illustrates an example 200 of determining merchant groups for combined ordering according to some implementations. In this example, the combined ordering module 150 may determine a combined ordering group 202 of merchants 114 having pickup locations 124 within a threshold distance of the pickup locations 124 of other merchants 114 within the group 202. For instance, for a plurality of merchants 124(1)-124(6), the service computing device 102 may determine the distance between the pickup locations 124(1)-124(6), as indicated by arrows 204, and may select particular merchants to include within the combined ordering group 202 based on the distances being less than the threshold distance.

In some cases, the combined ordering module 150 may use clustering techniques to determine groups of pickup locations 124 that are clustered sufficiently close together so that a courier stationed at the cluster may travel between any of the pickup locations 124 within a threshold time corresponding to the threshold distance. Thus, the combined ordering module 150 may ensure that the pickup location of any merchant 114 included in the combined ordering group 202 is within the threshold distance of the pickup location of any other merchant included in the combined ordering group 202.

In the illustrated example, suppose that distance 204(1) between the third pickup location 124(3) and the fifth pickup location 124(5) is less than the threshold distance, while the distance 204(2) between the fifth pickup location 124(5) and the sixth pickup location 124(6) is greater than the threshold distance. Accordingly, the sixth merchant 114(6) may not be included in the combined ordering merchant group 202. This may be so even if the distance 204(3) between the sixth pickup location 124(6) and the third pickup location 124(3) is within the threshold distance. Thus, in this example, the combined ordering group 202 may include the first through the fifth merchants 114(1)-114(5), but not the sixth merchant 114(6), as indicated by the dashed line.

The geographic locations of the pickup locations 124 of the merchants 114 may be determined based on GPS information received from each merchant device, address information associated with each merchant account, other location information received from the merchant devices, or through any of various other techniques. For example, the merchant devices may include GPS receivers able to provide location information to the combined ordering module 150. As another example, the merchants 114 may provide address information or other location information to the combined ordering module 150. The combined ordering module 150 may determine the distances between the pickup locations 124 from mapping information, e.g., by entering the location information for each merchant into a mapping website, a mapping database, or through the use of other mapping information.

In some examples, the threshold distance may be determined so that a predicted courier travel time from any of the pickup locations 124 to any of the other pickup locations 124 is less than a threshold travel time, such as two minute or less, three minutes or less, etc., which may be inclusive of time to access the pickup location 124 and obtain an item. For instance, if the combined ordering group 202 of merchants is a group of food trucks, the first courier may be able to travel from, e.g., the third pickup location 124(3) to the fifth pickup location in less than a threshold courier travel time and this may correspond to the threshold distance.

As an example, suppose that the buyer 110 places an order for a first item from the first merchant and a second item from the fifth merchant. The service computing device 102 receives the order and the combined ordering module 150 may predict a first preparation time, e.g., 15 minutes, for the first item and a second preparation time, e.g., 5 minutes, for the second item, such as based past order history and current merchant load. To minimize the possibility of spoilage, the combined ordering module 150 may send the first order to the first merchant and request confirmation that the first order will be ready in 15 minutes. Upon receiving confirmation, the combined ordering module 150 may send the order for the second item to the fifth merchant, with a request that preparation of the second order be delayed and be prepared for pickup in 15 minutes.

Further, the combined ordering module 150 may send first order information to the first courier 120(1) to request that the first courier 120(1) pick up the first item and the second item in 15 minutes. Additionally, the combined ordering module 150 may send second order information to a second courier 120(2) to request that the second courier 120(2) pick up the first item and the second item from the first courier at the handoff location 123 in 15 minutes and deliver the items to buyer 110 at the delivery location 126.

Figure 3:
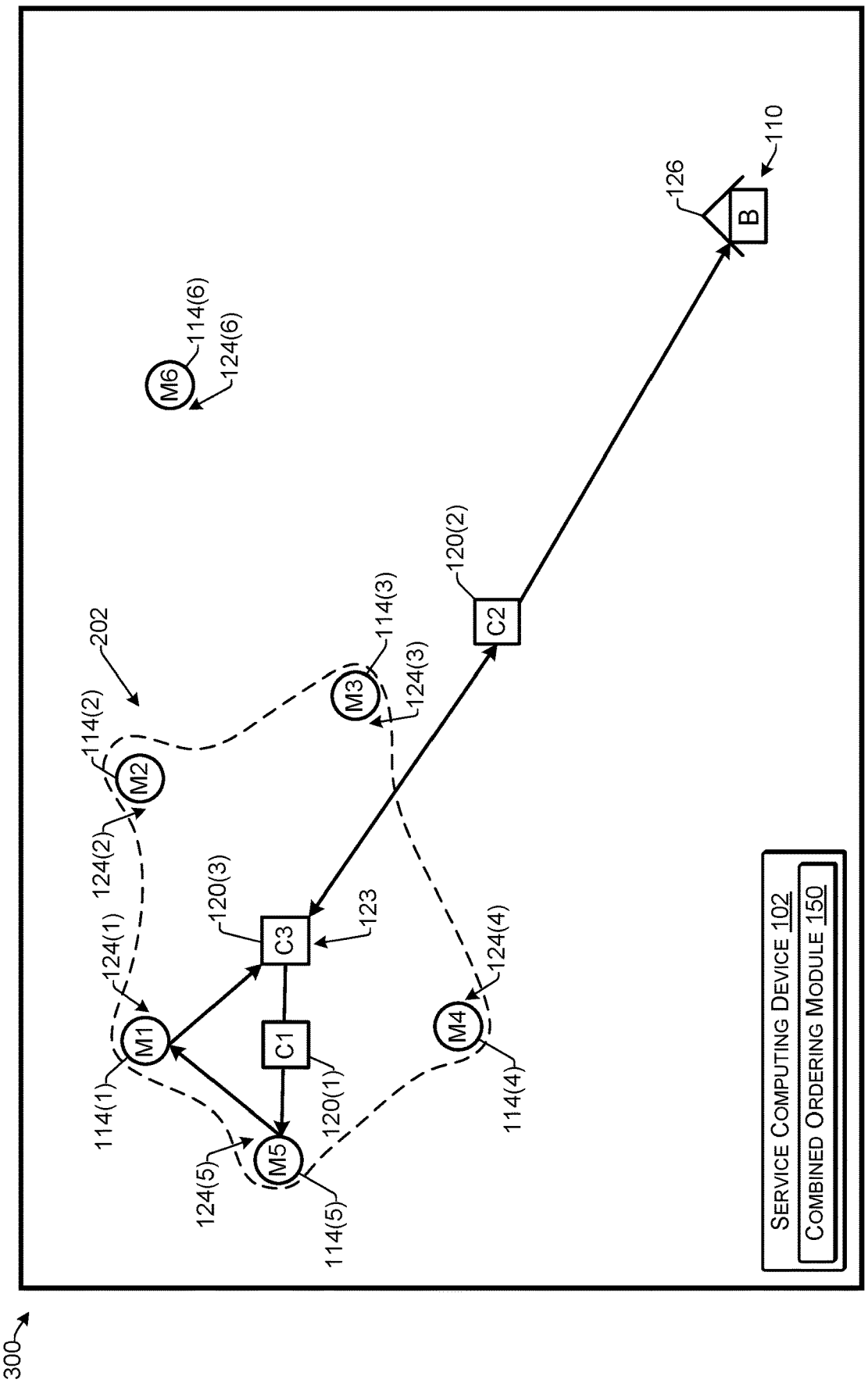
FIG. 3 illustrates an example of including a third courier for fulfilling combined order deliveries according to some implementations.

FIG. 3 illustrates an example 300 including the combined ordering group 202 according to some implementations. In this example, suppose that the combined ordering group 202 is the same as discussed above with respect to FIG. 2. In this example, first courier 120(1) may serve as a runner who may transport items from the merchants 114(1)-114(5) to a third courier 120(3), who may remain stationed at the handoff location 123. For instance, in the case that there are a large number of orders to be prepared by the combined ordering group 202, the first courier 120(1) may pick up the items from the various merchants 114(1)-114(5) and deliver the items to the handoff location 123. The third courier 120(3) may organize the orders at the handoff location 123, such as by labeling and packaging the orders for delivery, and may handoff the orders to the second couriers 120(2) who will deliver the orders to the buyers.

In the example discussed above with respect to FIG. 2, the buyer orders a first item from the first merchant 114(1) and a second item from the fifth merchant 114(5). Thus, when the first item and the second item are scheduled to be ready for pickup, the first courier 120(1) may go the fifth pickup location 124(5) to pick up the second item and to the first pickup location 124(1) to pick up the first item (or vice versa), and may deliver these items to the third courier 120(3) at the handoff location 123. The second courier 120(2) receives the items from the third courier 120(1) at the handoff location 123 and delivers the items to the buyer 110 at the buyer location 126.

Additionally, in some examples, the third courier 120(3) (or the first courier in cases in which there is not a third courier) may spontaneously establish the handoff location 123. For example, the third courier 120(3) may receive information about a recommended handoff location from the service computing device 102. For instance, the recommended handoff location may be determined based in part on a geographic centroid of the merchant group 202, but may further be determined based on other considerations such as traffic flow and accessibility to the second courier 120(2). Accordingly, the third courier 120(3) may receive the recommended handoff location and may subsequently use his or her own judgment for determining an optimal location for the handoff location. In some examples, the third courier may set up a stand, table, or the like, at the handoff location, and may notify the service computing device of the location of the handoff location, such as through GPS coordinates provided by a GPS receiver onboard the courier device of the third courier 120(3). Thus, implementations herein enable dynamic creation of a handoff location 123 and further enable subsequent relocation of the handoff location 123 as needed or desired. For instance, if business at the group of merchants 202 is slow, the first and second couriers may relocate and start filling orders for a different combined ordering group of merchants at a different location.

Figure 4:
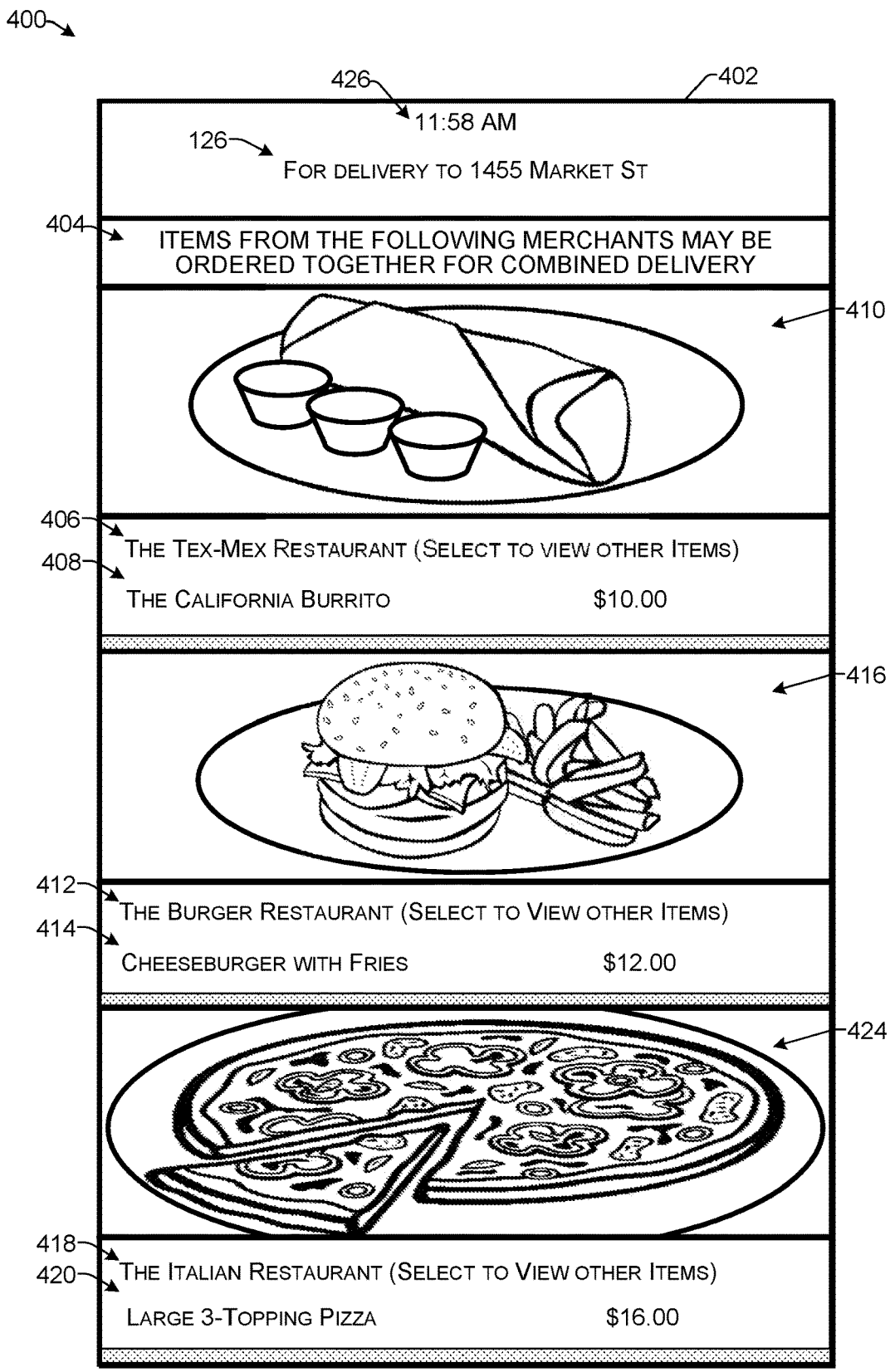
FIG. 4 illustrates an example graphic user interface for presentation of merchant and item information on a buyer device according to some implementations.

FIG. 4 illustrates an example GUI 400 presenting merchant information on a display 402 associated with the buyer device 132 according to some implementations. In this example, suppose that the buyer device has received item information from the service computing device, such as discussed above with respect to FIG. 1. The item information may include information related to merchants in a combined ordering group. As discussed above, the buyer may be able to order items from any of the merchants in the group as a combined order. For example, in a combined order, the ordered items may be delivered together by a courier to the delivery location. Further, in some cases, the buyer may not incur additional delivery fees, or the like, when ordering a combined order from multiple merchants, and may be able to pay for the order as a single financial transaction. In this example, information about three of the merchants in a combined ordering group is presented on the display 402, and the buyer may be able to scroll up/down and/or left/right to view additional merchants in the combined ordering group.

As illustrated, at 404, the GUI 400 may indicate that the buyer is able to create an order by combining items from the merchants included in the combined ordering group. The GUI 400 may further present information related to each merchant and a representative item offered by each merchant, such as a popular item. Thus, in this example, the GUI 400 includes the name of a first merchant 406, i.e., the Tex-Mex Restaurant along with the name and price of a representative item 408, i.e., the California Burrito, and an image 410 of the representative item. The GUI 400 further includes the name of a second merchant 412, i.e., the Burger Restaurant along with the name and price of a representative item 414, i.e., the Cheeseburger with Fries, and an image 416 of the representative item. The GUI 400 further includes the name of a third merchant 418, i.e., the Italian Restaurant along with the name and price of a representative item 420, i.e., Large 3-Topping Pizza, and an image 424 of the representative item. Additionally, the buyer may be able to tap on, or otherwise select, an area of the display 402 to view other items available from a particular one of the merchants.

In addition, the GUI 400 may include a delivery location 126, such as an address to which the order is to be delivered. For example, when the buyer opens or otherwise accesses the buyer application 134, the buyer application 134 may initially request that the buyer indicate the desired delivery location 126. The buyer application 134 may send this information to the service computing device 102. In some cases, the delivery location 126 may be the current location of the buyer device 132, which may be determined at least in part by one or more location sensors, such as a GPS receiver (not shown in FIG. 4) onboard the buyer device 132. In other cases, the buyer 110 may enter an address as the delivery location, may proceed with a default address, may select a previously used address, or the like. Further, the buyer application 134 may, by default, assume that the buyer is interested in ordering now for immediate delivery, i.e., as soon as the order can be prepared and delivered. If the buyer prefers a later delivery time or date, the buyer may select one or more options in the GUI to select a later time or day, and this time information may be sent to the service computing device 102 with the delivery location information.

In the illustrated example, current time is indicated at 426 to be 11:58 AM. In some examples, when presenting information about particular items, the GUI 400 may further present an estimated time at which the particular item can be delivered to the delivery location 126. For example, as discussed above, the service provider may determine a predicted preparation time for each item and may further determine a predicted courier travel time from the handoff location to the delivery location for providing an approximate time within which the particular item may be delivered to the delivery location. In some cases, the service provider may determine a predicted courier travel time from the handoff location to the delivery location 126 by taking into consideration current local conditions such as traffic and weather. Further, the service provider may add in an estimated time for the first courier to pick up the items from the merchants, return to the handoff location, and handoff the items to the second courier when determining the predicted courier travel time to the delivery location 126.

To place an order, the buyer may select the name or the representation of one or more of the items, such as by tapping on a particular item representation or by tapping on an area of the display 402 associated with the particular item. The buyer may then subsequently be presented with a pop-up window, a separate GUI, or the like (not shown in FIG. 4), asking the buyer to select or confirm a delivery time interval and price for the selected item(s). Accordingly, the buyer may select any of the available items to be delivered. The service computing device may receive the buyer's selection and send order information about the buyer's selection to the merchant device(s) of the corresponding merchant(s). For example, the order information may be sent directly to the particular merchant device, along with a requested preparation time, and queued by the merchant application with other orders that are received by that merchant.

Further, the GUI 400 is just one example of a possible GUI for presenting item information according to some implementations herein. Numerous other variations will be apparent to those of skill in the art having the benefit of the disclosure herein.

Figure 5:
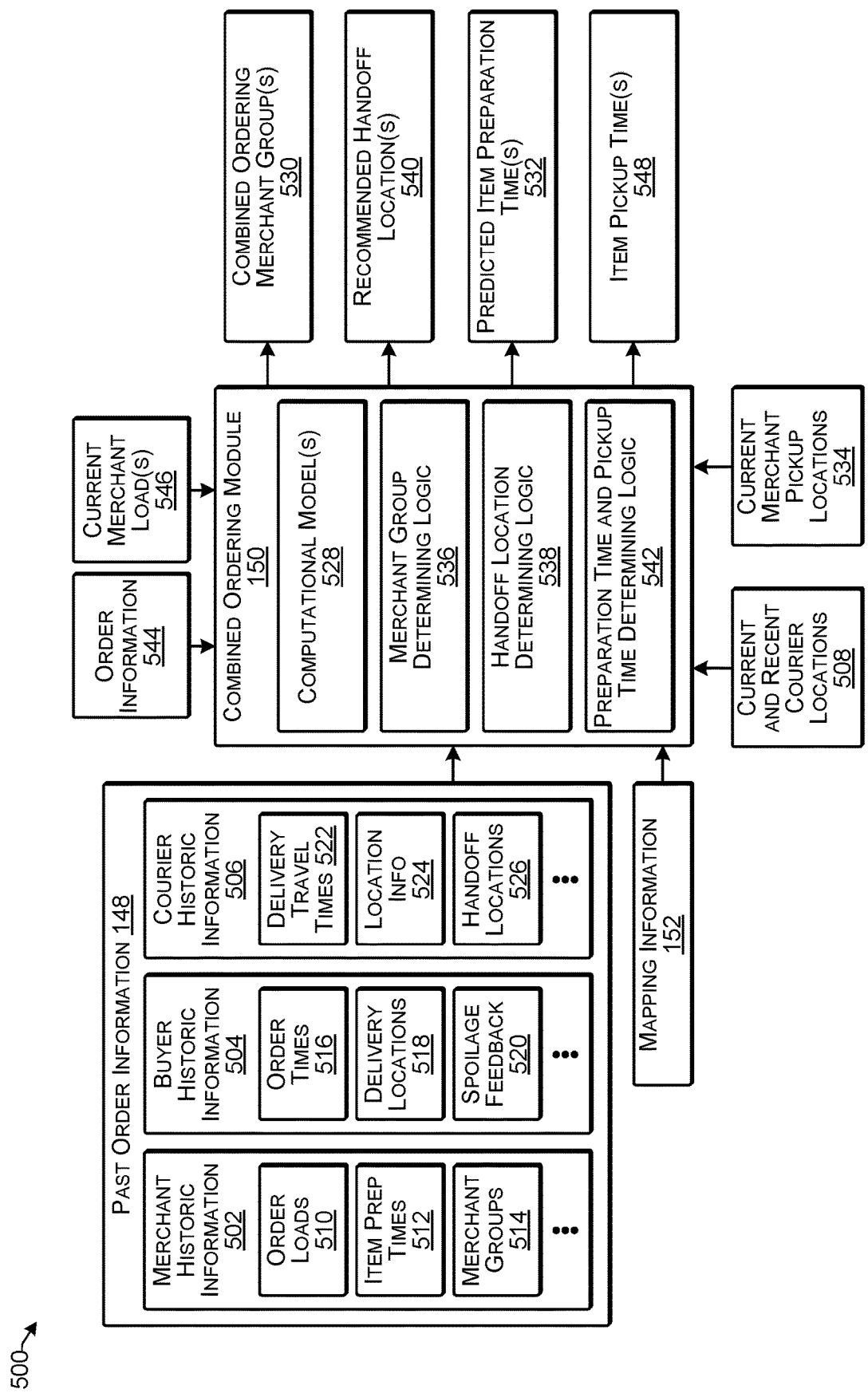
FIG. 5 is a block diagram illustrating an example framework for enabling combined orders from multiple merchants according to some implementations.

FIG. 5 is a conceptual block diagram 500 illustrating an example of determining merchant groups for combined orders and determining predicted preparation times for ordered items according to some implementations. In this example, the combined ordering module 150 may receive the past order information 148 including merchant historic information 502, buyer historic information 504, and courier historic information 506. In addition, the combined ordering module 150 may receive map information 152 discussed above with respect to FIG. 1. Additionally, the combined ordering module 150 may receive current and recent courier location information 508. Further, while several types of information that may be used by the combined ordering module 150 are illustrated, in other examples, other or additional types of information may be used by the combined ordering module 150, as discussed above, and/or as will be apparent to those of skill in the art having the benefit of the disclosure herein.

The merchant historic information 502 includes historic order information related to the merchants, e.g., various types of information related to past orders filled by the merchants that participate in the service of the service provider 104. For instance, the merchant historic information 502 may include order loads 510 from each merchant at particular times on particular days of the week, particular dates, and the like, indicating how many orders each merchant was fulfilling ate the particular times.

Further, the merchant historic information 502 may include past item preparation times 512 for each item offered by each merchant. As one example, each merchant may initially specify an expected preparation time for each item or each category of item offered by the merchant when the merchant joins the service. In some cases, the merchants or the service provider may categorize items into preparation-time-based item categories, such that items having similar preparation times are categorized into the same item category. Subsequently, as the service provider determines actual item preparation times for particular items offered by each merchant, and further, the order load 510 on each merchant when the preparation times are determined, the combined ordering module 150 may use a current merchant order load to determine a predicted preparation time for an item for a current order, as discussed additionally below.

Further, the merchant historic information 502 may include information about the merchant groups 514 that have been identified for combined ordering in the past. For instance, the merchant groups information 514 may identify the merchants making up combined ordering groups, whether the groups are permanent or temporary, locations of the merchants in each group, number of combined orders received for each group, and so forth.

Additionally, the buyer historic information 504 includes historic order information related to the buyers. Examples of buyer historic information 504 may include order times 516, e.g., a time of day, day of the week, and date on which each order was placed. The buyer historic information 504 may further include delivery locations 518 to which each order was delivered, and spoilage feedback 520. For instance, feedback may be received from the buyer devices that may indicate if one or more items from an order spoiled prior to delivery to the buyer. Spoilage may be indicated by items that are of a degraded quality. This spoilage feedback 520 may be used to adjust or otherwise change certain thresholds used herein. For example, if spoilage feedback 520 is consistently received for an item in an order that is picked up before another item in the same order, this spoilage feedback 520 may indicate that the threshold distance between the merchants in a combined ordering group might need to be reduced.

Further, the courier historic information 506 includes historic order information related to the couriers. For example, the courier historic information 506 may include delivery travel times 522, which may indicate the time that an order was picked up from the handoff location and the time that the order was delivered to the delivery location, and may further include how long it took a courier to arrive at the handoff location after picking items from the merchant pickup locations. Additionally, location information 524 may include locations of individual couriers at different times of day, for different days of the week in different parts of the service region. For instance, the courier location information 524 may indicate speeds at which couriers are able to travel on different streets in the service region at different times of day, thereby providing an indication of traffic information and an indication of predicted delivery travel times at different times of day and different days of the week. The location information 524 may further indicate how far each courier had to travel after picking up each order to make delivery of the order.

In some examples, the courier application may automatically send courier locations 508 to the combined ordering module 150 on a periodic basis while the associated courier is on-duty or otherwise active. Alternatively, the combined ordering module 150 may periodically ping the courier devices of active couriers to determine the couriers' current locations. The received courier locations 508 may indicate current courier geographic locations, travel speeds and conditions, and may be stored as location information 524. Each courier device may include one or more location sensors, such as a GPS receiver, or communication interfaces that can determine (e.g., from cell towers or wireless access points) a geographic location of the courier device.

In addition, the courier historic information 506 may include past handoff locations 526, which may indicate locations at which a courier was stationed or otherwise performed handoffs of combined orders. Further, the handoff locations 526 may include information about the handoff locations, such as convenience for other couriers to pickup orders, amount of courier travel time from the handoff location to the merchant pickup locations of the merchants in the corresponding merchant combined ordering group, travel time to buyer delivery locations from the handoff location, and so forth.

In some implementations, the combined ordering module 150 may employ one or more computational models 528 for determining merchant groups 530 for combined ordering and/or for determining predicted item preparation times 532 for various different items offered by various different merchants. For instance, the combined ordering module 150 may determine clusters of merchant pickup locations that are within a threshold distance of each other. As a non-limiting example, the threshold distance may be several hundred yards or less such that a courier on foot may travel between multiple merchants in several minutes and return to a handoff location.

Typically, for stationary merchants, after a combined ordering merchant group has been determined, the combined ordering module may not need to determine the merchant group again unless a parameter changes, such as the threshold distance changes, or if a new merchant begins doing business sufficiently near to the group to be added to the group. Accordingly, already-determined merchant groups may be known from the merchant groups 514 included in the merchant historic information 502. On the other hand, for mobile merchants such as food trucks, or other types of mobile vendors, a combined ordering merchant group 530 may be determined temporarily by the combined ordering module 150. For instance, the combined ordering module 150 may receive current merchant pickup locations 534 for a plurality of merchants, such as by receiving GPS information from respective merchant devices of the respective merchants, or through other techniques such as by receiving an electronic message including current address information or the like.

Accordingly, a new combined ordering merchant group 530 may be determined based on the received current merchant pickup locations 534 being within a threshold distance of other merchant pickup locations. As mentioned above, clustering techniques or other suitable algorithms may be employed by the computational model 528 for determining merchants having pickup locations within the threshold distance of each other. For instance, when determining clusters of merchants, a plurality of merchant pickup locations 534 may be provided to the one or more computational models 528 such as in the form of longitude and latitude GPS coordinates. The computational model(s) 528 may determine clusters of the pickup locations 534, such as based on any suitable clustering algorithm, e.g., density-based clustering, centroid-based clustering, or the like. As one example, a clustering algorithm, such as the k-means algorithm, may be used to determine clusters of pickup locations based at least in part on determining the distances between the respective pickup locations.

Further, the computational model(s) 528 may employ the mapping information 152 when determining distances between respective geographic locations. Furthermore, merchant group determining logic 536 may include one or more algorithms, one or more computational models, a plurality of decision-making rules, determinative rules, business rules, or the like that may receive information about an identified cluster of pickup locations and may determine whether there is a viable merchant group, such as based on geographic conditions, and the like. For instance, two merchants may be within the threshold distance of each other but if they are on opposite sides of a river with no nearby bridge then they may not be included in the same merchant group 530.

In addition, the one or more computational models 528 may determine a centroid of an identified cluster that may be used subsequently by handoff location determining logic 538 when determining a recommended handoff location for a particular merchant group 530. For instance, a courier may be stationed close to the center of merchant group 530 if possible but the handoff location determining logic may determine that a more suitable location would be closer to a road that other couriers can use for accessing the handoff location. Accordingly, the combined ordering module 150 may employ handoff location determining logic 538 for determining recommended handoff locations 540 at which a courier may be stationed to wait for orders to be received and to perform handoffs to other couriers.

In addition, the one or more computational models 528 may also be used by preparation time and pickup time determining logic 542 for determining predicted item preparation times 532 for the items offered by merchants in a merchant group 530 and/or 514. The predicted item preparation times 532 may include the time for preparing the item, such as cooking, as well as the time for packaging an item for transport. For instance, the preparation time and pickup time determining logic 542 may receive order information 544 for a current order, such as merchant identity, items ordered, etc. Further, in some examples, the preparation time and pickup time determining logic 542 may receive a current merchant load 546 for at least the merchants identified in the order information 544.

The preparation time and pickup time determining logic 542 may use one or more computational models 528 to determine the predicted item preparation times 532 of various different items corresponding to the order information 544. For instance, the predicted preparation times 532 may be based at least in part on the item preparation times 512 indicated in the merchant historic information 502. Additionally, in some examples, the predicted preparation times 532 may be determined based at least in part on the current merchant load 546. For example, by comparing the current merchant load 546 with the historic merchant order loads 510 and the item preparation times 512 item corresponding to the historic order loads 510, the one or more computational models 528 may determine current predicted item preparation times 532 for particular items ordered in the order information 544. From these preparation times, the preparation time and pickup time determining logic 542 may determine targeted pickup times 548 for each item in an order.

As one example, the computational model(s) 528 may include one or more trained statistical models that account for numerous pieces of information included in the past order information 148, as well as current information, such as time, day and date information, order information 544 and/or current merchant load 546. In some cases, the one or more statistical models may be initially trained using a set of training data, checked for accuracy, and then used for determining at least one of predicted preparation times based on a confidence score exceeding a specified threshold of confidence. The statistical model(s) may be periodically updated and re-trained based on new training data to keep the model(s) up to date and accurate. Examples of suitable statistical models that may be incorporated into the computational model(s) 528 herein may include regression models, such as linear and nonlinear regression models, and stochastic models, such as Markov models, hidden Markov models, and so forth.

Additionally, while the computational models 528 have been described as one example of a technique for determining predicted preparation times 532 and/or merchant groups 530 and/or recommended handoff locations 540, numerous other techniques, algorithms, decision-making rules, and the like, may additionally, or alternatively, be used for determining this information. Accordingly, implementations herein are not limited to use of a computational model 528.

After the preparation time and pickup time determining logic 542 has determined, for the current order information 544, predicted item preparation times 532 the combined ordering module 150 may apply the preparation time and pickup time determining logic 542 to determine which merchant to send a request for pickup time for a particular item. In some examples, the preparation time and pickup time determining logic 542 may include one or more algorithms, one or more computational models, a plurality of decision-making rules, business rules, or the like, configured to manage preparation timing of a plurality of items in an order. For instance, the preparation time and pickup time determining logic 542 may employ the techniques discussed above to determine by what time when each merchant should have each respective item prepared.

Similarly, in the case that two different buyers place orders that are close in time, e.g., the orders are received within a threshold time of each other, such as five minutes, the preparation time and pickup time determining logic 542 may determine that preparation of one of the items may be delayed slightly so that the two items can be picked up together by a single courier. Additionally, or alternatively, the handoff of the items can be timed so that the items are both at the handoff location at the same time and able to be picked up together by a second courier, such as in the case that the delivery location of the first order is within a threshold proximity of the delivery location of the second order.

Figure 6:
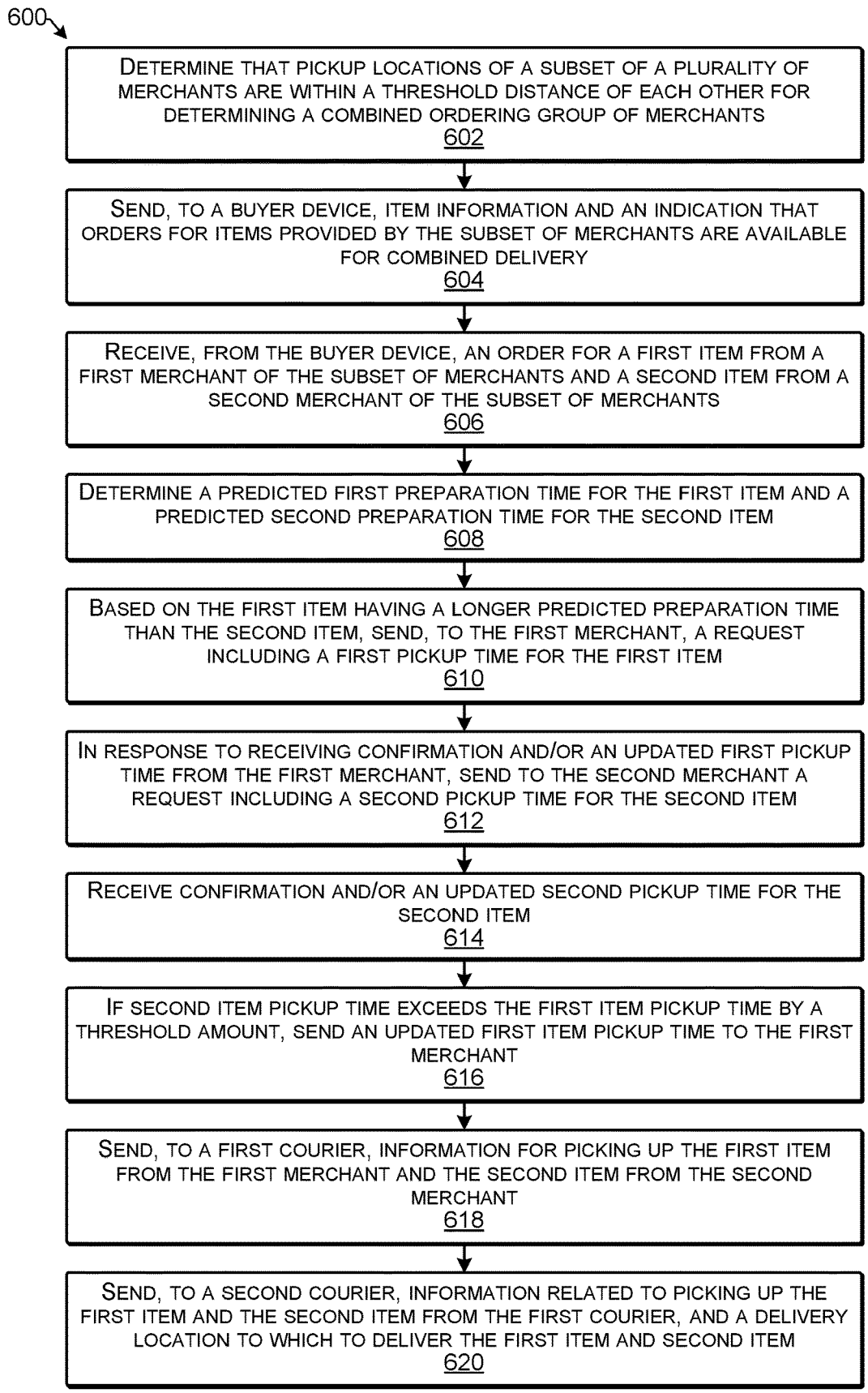
FIG. 6 is a flow diagram illustrating an example process for enabling combined orders from multiple merchants according to some implementations.
Figure 7:
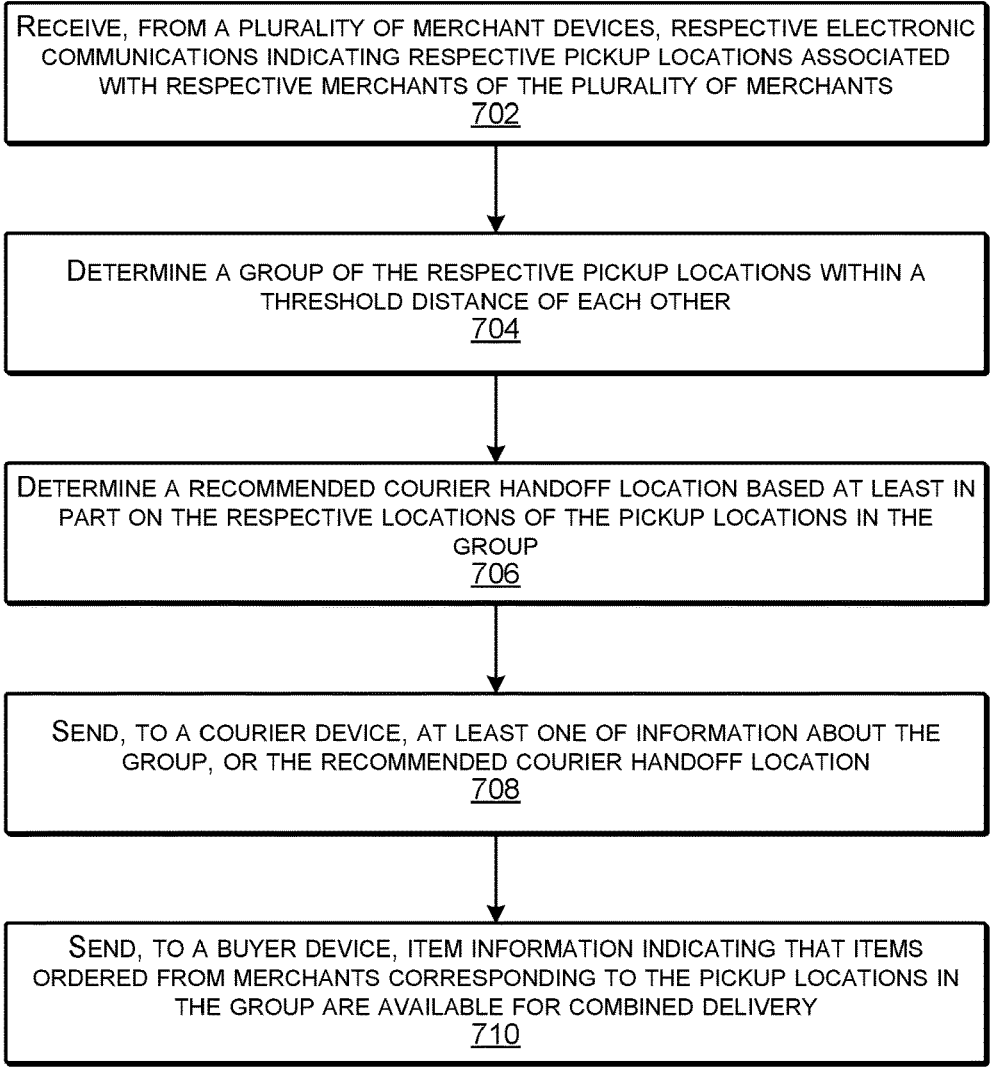
FIG. 7 is a flow diagram illustrating an example process for determining a group of merchants for combining deliveries according to some implementations.

FIGS. 6 and 7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 6 is a flow diagram illustrating an example process 600 enabling ordering of items from multiple merchants for combined delivery according to some implementations. In some examples, the process may be executed at least in part by the service computing device 102.

At 602, the service computing device may determine that pickup locations of a subset of a plurality of merchants are within a threshold distance of each other for determining a combined ordering group of merchants. For example, the service computing device may use clustering techniques or other suitable techniques to identify merchants within a threshold distance of each other.

At 604, the service computing device may send, to a buyer device, item information and an indication that orders for items provided by the subset of merchants are available for combined delivery.

At 606, the service computing device may receive, from the buyer device, an order for a first item offered by a first merchant of the group of merchants and a second item offered by a second merchant of the group of merchants.

At 608, the service computing device may determine a predicted first preparation time for the first item and a predicted second preparation time for the second item. In some examples, the service computing device may receive merchant information from the merchant devices indicating current loads on each of the merchants. The service computing device may compare the current loads with past loads and may determine item preparation times associated with similar past loads to determine predicted item preparation times for the first item and the second item.

At 610, based on the first item having a longer predicted preparation time than the second item, the service computing device may send, to the first merchant, a request for a first preparation time for the first item.

At 612, in response to receiving a confirmed first pickup time from the first merchant, the service computing device may send, to the second merchant, a request for a second preparation time for the second item. For instance, the service computing device may receive, from the first merchant device, a confirmed first pickup time that includes at least one of a confirmation of the first pickup time proposed by the service provider or a revised first pickup time proposed by the first merchant for the first item.

At 614, the service computing device may receive confirmation and/or a revised pickup time for the second item. For instance, the service computing device may receive, from the second merchant device, a confirmed second pickup time that includes at least one of a confirmation of the second pickup time proposed by the service provider or a revised second pickup time proposed by the second merchant for the second item.

At 616, if a revised second item pickup time exceeds the first item pickup time by a threshold amount, the service computing device may send an updated first item pickup time to first merchant. As one example, if the revised pickup time for the second item is 10 minutes or more after the confirmed pickup time for the first item, the service computing device may send an updated first item pickup time to the first merchant to delay the preparation of the first item so that the first item and the second item will be ready for pickup at approximately the same time.

At 618, the service computing device may send, to a first courier, information for picking up the first item from the first merchant and the second item from the second merchant. For example, the information may include the name and/or pickup location of the first merchant, the name and/or pickup location of the second merchant, may identify the items being picked up from each merchant, and may indicate at least one pickup time, such as the first confirmed pickup time or the second confirmed pickup time, which in some cases may be the same time.

At 620, the service computing device may send, to a second courier, information related to picking up the first item and the second item from the first courier, and a delivery location to which to deliver the first item and second item. For instance, the information may provide the geographic location of the handoff location at which the second courier is to pick up the items. In some examples, the handoff location may be stationed by a third courier. Thus, the service computing device may determine, based on location information received from a GPS receiver associated with a third courier device associated with the third courier, an indicated geographic location associated with the third courier device. Further, the service computing device may send, to at least one of the first courier device or the second courier device, an indication that the handoff location is the indicated geographic location of the third courier device. In addition, the service computing device may send, to the third courier device, information about the first item and the second item being delivered to the handoff location by the first courier, and an indication of a timing for the second courier to pick up the first item and the second item from the handoff location.

FIG. 7 is a flow diagram illustrating an example process 700 for determining a combined ordering merchant group according to some implementations. In some examples, the process may be executed, at least in part, by the service computing device 102 or by another suitable computing device. Some or all of the process 700 may be combined with the process 600 in some examples.

At 702, the service computing device may receive, from a plurality of merchant devices, respective electronic communications indicating respective pickup locations associated with respective merchants of the plurality of merchants. In some examples, the service computing device may receive GPS location information from at least some of the merchant devices.

At 704, the service computing device may determine a group of the respective pickup locations within a threshold distance of each other. As discussed above, in some examples, the service computing device may employ clustering techniques or other suitable algorithms.

At 706, the service computing device may determine a recommended courier handoff location based at least in part on the respective locations of the pickup locations in the group. In some examples, the recommended handoff location may be based at least in part on a geographic centroid of the group.

At 708, the service computing device may send, to a courier device, at least one of information about the group, or the recommended courier handoff location. In some cases, the courier may establish the handoff location based on the recommended handoff location. In other cases, the courier may use his or her own judgement as to where to locate the handoff location and may provide GPS information to the service computing device to indicate the handoff location.

At 710, the service computing device may send, to a buyer device, item information indicating that items ordered from merchants corresponding to the pickup locations in the group are available for combined delivery. For example, in response, at least in part, to the sending of the item information, the buyer device may be programmed to present information related to the items offered by the group of merchants with an indication that the items offered by the group of merchants are available for combined delivery. Additionally, if a new merchant is added to the group, the item information may be updated to include items offered by the new merchant. For example, the service computing device may receive additional location information from a merchant device associated with another merchant who has moved closer to at least one pickup location of a merchant in the group. The service computing device may determine that a pickup location associated with the other merchant is within the threshold distance of the pickup locations of all the merchant in the group, and may include information related to items offered by the other merchant with the item information sent to the buyer device indicating that items ordered from the group of merchants corresponding to the pickup locations are available for combined delivery.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
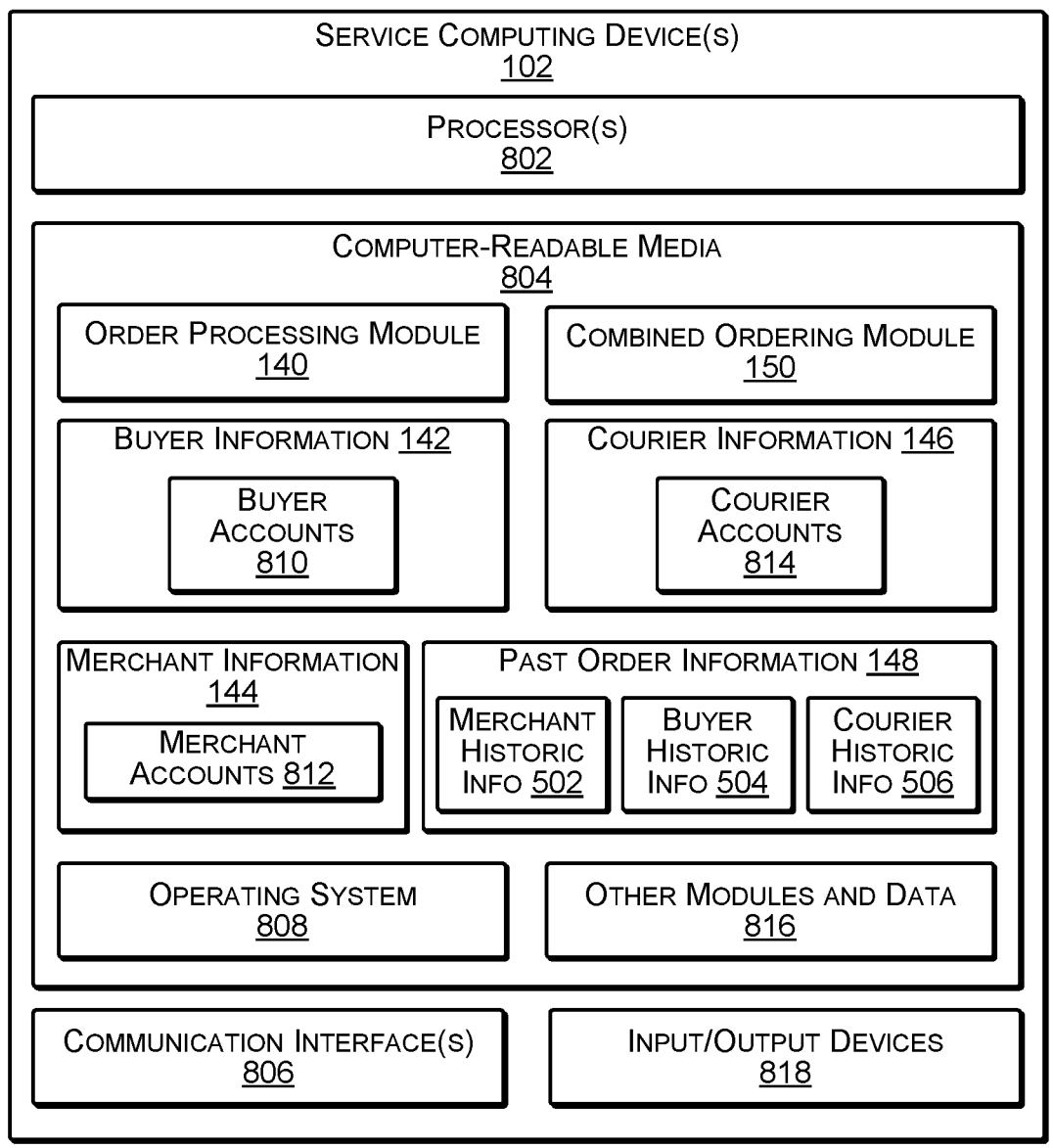
FIG. 8 illustrates select components of one or more example service computing devices according to some implementations.

FIG. 8 illustrates select components of the service computing device 102 that may be used to implement some functionality of the combined order processing services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that, when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the order processing module 140 and the combined ordering module 150. Additional functional components stored in the computer-readable media 804 may include an operating system 808 for controlling and managing various functions of the service computing device 102.

In addition, the computer-readable media 804 may store data used for performing the operations described herein. Thus, the computer-readable media 804 may store the buyer information 142, including buyer accounts 810, the merchant information 144, including merchant accounts 812, and the courier information 146, including courier accounts 814. Further, the computer-readable media 804 may include the past order information 148, such as the merchant historic information 502, the buyer historic information 504, and the courier historic information 506. The service computing device 102 may also include or maintain other functional components and data not specifically shown in FIG. 8, such as other modules and data 816, which may include programs, drivers, etc., and the data used or generated by the functional components. Further, the service computing device 102 may include many other logical, programmatic, and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks (e.g., fiber optic and Ethernet), as well as short-range communications, such as BLUETOOTH®, BLUETOOTH® low energy, and the like, as additionally enumerated elsewhere herein.

The service computing device 102 may further be equipped with various input/output (I/O) devices 818. Such I/O devices 818 may include a display, various user interface controls (e.g., buttons, joystick, keyboard, mouse, touch screen, etc.), audio speakers, connection ports and so forth.

Figure 9:
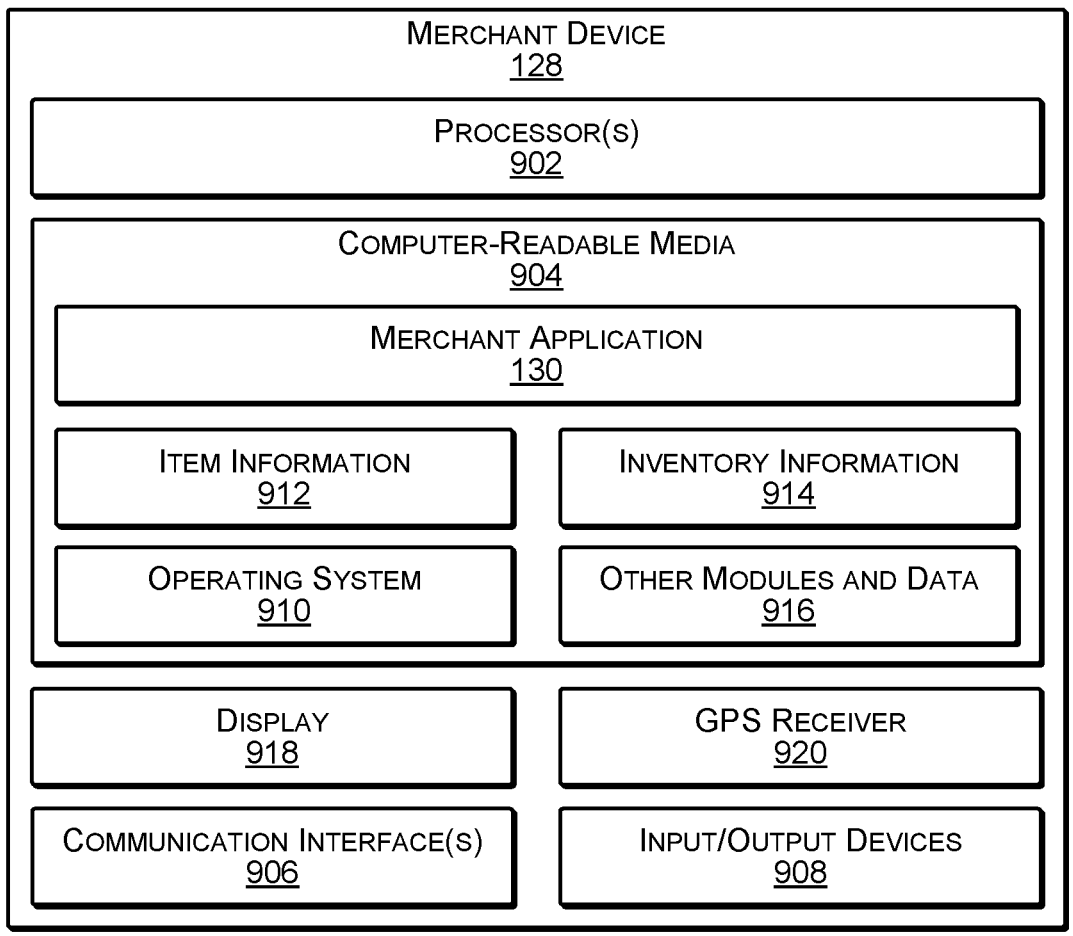
FIG. 9 illustrates select components of an example merchant device according to some implementations.

FIG. 9 illustrates select example components of an example merchant device 128 according to some implementations. The merchant device 128 may be any suitable type of computing device, e.g., portable, semi-portable, semi-stationary, or stationary. Some examples of the merchant device 128 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 128 includes at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the merchant device 128, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 904 may include, but is not limited to, RAM, ROM, EEPROM, flash memory, solid-state storage, magnetic disk storage, optical storage, and/or other computer-readable media technology. Further, in some cases, the merchant device 128 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules, or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the merchant device 128. Functional components of the merchant device 128 stored in the computer-readable media 904 may include the merchant application 130. In some examples, the merchant application 130 may include transaction processing capability, such as for presenting an interface to enable the merchant to conduct transactions, receive payments, and so forth, as well as communicating with the service computing device 102 for processing payments, sending transaction information, receiving order information, sending merchant information, and so forth. Further, in some examples, the merchant application 130 may include merchant dashboard functionality, such as for presenting a GUI (not shown in FIG. 9) to enable the merchant to manage the merchant's account, the merchant profile, merchant preferences, view past orders, and the like. Additional functional components may include an operating system 910 for controlling and managing various functions of the merchant device 128 and for enabling basic user interactions with the merchant device 128.

In addition, the computer-readable media 904 may also store data, data structures and the like, that are used by the functional components. For example, data stored by the computer-readable media 904 may include item information 912 that includes information about the items offered by the merchant, which may include images of the items, descriptions of the items, prices of the items, preparation times for the items, and so forth. In addition, inventory information 914 may indicate how much of each item the merchant has in current inventory. Depending on the type of the merchant device 128, the computer-readable media 904 may also optionally include other functional components and data, such as other modules and data 916, which may include programs, drivers, etc., and the data used or generated by the functional components. Further, the merchant device 128 may include many other logical, programmatic, and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks, as well as short-range communications such as Bluetooth®, Bluetooth® low energy, and the like, as additionally enumerated elsewhere herein.

FIG. 9 further illustrates that the merchant device 128 may include a display 918. Depending on the type of computing device used as the merchant device 128, the display 918 may employ any suitable display technology, and may have a touch sensor in some examples. Alternatively, in some examples, the merchant device 128 may not include the display 918, and information may be presented by other means, such as aurally.

The merchant device 128 may further include the one or more I/O devices 908. The I/O devices 908 may include speakers, a microphone, a camera, and various user controls (e.g., buttons, a joystick, a keyboard, a keypad, etc.), a haptic output device, and so forth. In addition, in some examples, the I/O devices 908 may include a card reader. For instance, the card reader may plug in to a port in the merchant device, such as a microphone/headphone port, a data port, or other suitable port. The card reader may include a read head for reading a magnetic strip of a payment card, and further may include encryption technology for encrypting the information read from the magnetic strip. Additionally, or alternatively, numerous other types of card readers may be employed with the merchant devices 104 herein, such as RFID chip card readers, depending on the type and configuration of the merchant device 128.

Further, in some examples, the merchant device 128 may include a GPS receiver 920, such as in the case that the merchant is a mobile merchant who does not always conduct business in the same geographic location. The GPS receiver 920 may be used by the merchant application 130 to determine a current geographic location of the merchant device 128. Additionally, or alternatively, the communication interfaces 906 may be used to determine the current location of the merchant device 128, such as based on communication with nearby cell towers, wireless access points, and the like. In some examples, the merchant application 130 may send this location information periodically to the service computing device as an indicated location of the associated merchant. Additionally, the merchant device 128 may include various other components that are not shown, examples of which include sensors, removable storage, a power source, such as a battery and power control unit, and so forth.

Figure 10:
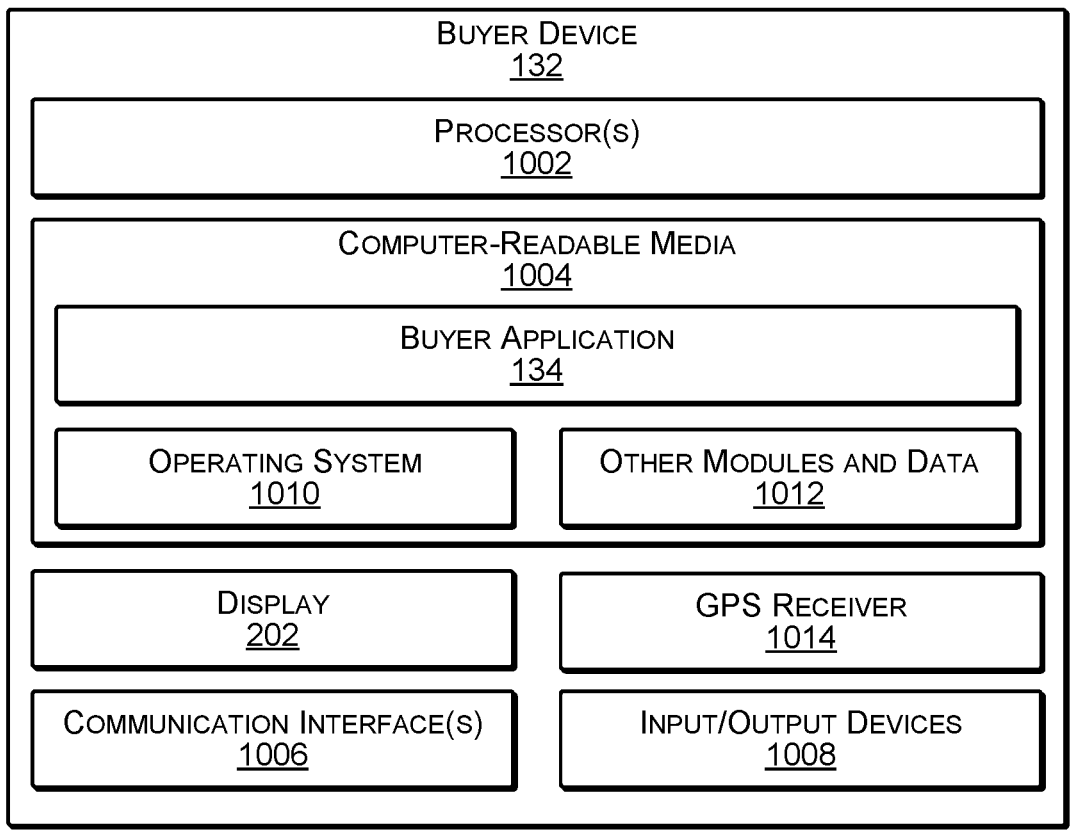
FIG. 10 illustrates select components of an example buyer device according to some implementations.

FIG. 10 illustrates select example components of the buyer device 132 that may implement the functionality described above according to some examples. The buyer device 132 may be any of a number of different types of computing devices. Some examples of the buyer device 132 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 132 may be a stationary or semi-stationary computing device, such as a desktop computer or other device with computing capabilities.

In the example of FIG. 10, the buyer device 132 includes components such as at least one processor 1002, one or more computer-readable media 1004, one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of the buyer device 132, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1004 may include, but is not limited to, RAM, ROM, EEPROM, flash memory, solid-state storage, magnetic disk storage, optical storage, and/or other computer-readable media technology. Further, in some cases, the buyer device 132 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules, or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the buyer device 132. Functional components of the buyer device 132 stored in the computer-readable media 1004 may include the buyer application 134, as discussed above, which may present the buyer with one or more GUIs for placing an order, some examples of which are described above. Additional functional components may include an operating system 1010 for controlling and managing various functions of the buyer device 132 and for enabling basic user interactions with the buyer device 132.

In addition, the computer-readable media 1004 may also store data, data structures and the like, that are used by the functional components. Depending on the type of the buyer device 132, the computer-readable media 1004 may also optionally include other functional components and data, such as other modules and data 1012, which may include applications, programs, drivers, etc., and the data used or generated by the functional components. Further, the buyer device 132 may include many other logical, programmatic, and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks (e.g., fiber optic, Ethernet), as well as short-range communications such as BLUETOOTH®, BLUETOOTH® low energy, and the like, as additionally enumerated elsewhere herein.

FIG. 10 further illustrates that the buyer device 132 may include the display 402, which may employ any suitable display technology. In some examples, the display 402 may have a touch sensor to provide a touchscreen display. The buyer device 132 may further include the one or more I/O devices 1008. The I/O devices 1008 may include speakers, a microphone, a camera, and various user controls (e.g., buttons, a joystick, a keyboard, a keypad, etc.), a haptic output device, and so forth. Other components included in the buyer device 132 may include various types of sensors, which may include a GPS receiver 1014 able to indicate location information, as well as other sensors (not shown) such as an accelerometer, gyroscope, compass, proximity sensor, and the like. In some cases, the GPS receiver 1014 may be used by the buyer application 134 to determine or confirm a current geographic location of the buyer device 132. Additionally, or alternatively, the communication interfaces 1006 may be used to determine the current location of the buyer device 132, such as based on communication with nearby cell towers, wireless access points, and the like. In some examples, the buyer application 134 may send this location information to the service computing device as an indicated delivery location for the associated buyer. Additionally, the buyer device 132 may include various other components that are not shown, examples of which include removable storage, a power source, such as a battery and power control unit, and so forth.

Figure 11:
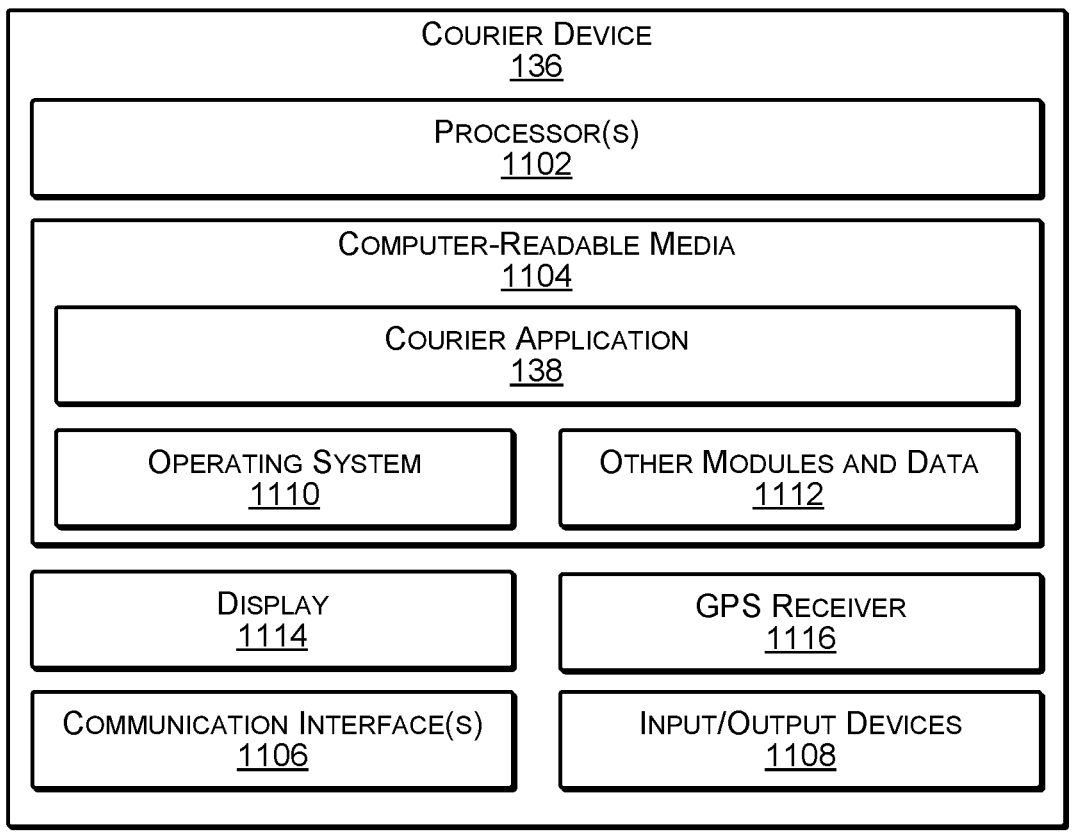
FIG. 11 illustrates select components of an example courier device according to some implementations.

FIG. 11 illustrates select example components of the courier device 136 that may implement the functionality described above according to some examples. The courier device 136 may be any of a number of different types of portable computing devices. Some examples of the courier device 136 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 11, the courier device 136 includes components such as at least one processor 1102, one or more computer-readable media 1104, one or more communication interfaces 1106, and one or more input/output (I/O) devices 1108. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable processor-executable instructions stored in the computer-readable media 1104.

Depending on the configuration of the courier device 136, the computer-readable media 1104 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 1104 may include, but is not limited to, RAM, ROM, EEPROM, flash memory, solid-state storage, magnetic disk storage, optical storage, and/or other computer-readable media technology. Further, in some cases, the courier device 136 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules, or components that may be executed by the processor 1102. Further, when mentioned, non-transitory computer-readable media exclude media such as energy, carrier signals, electromagnetic waves, and signals per se.

The computer-readable media 1104 may be used to store and maintain any number of functional components that are executable by the processor 1102. In some implementations, these functional components comprise instructions or programs that are executable by the processor 1102 and that, when executed, implement operational logic for performing the actions and services attributed above to the courier device 136. Functional components of the courier device 136 stored in the computer-readable media 1104 may include the courier application 138, as discussed above. Additional functional components may include an operating system 1110 for controlling and managing various functions of the courier device 136 and for enabling basic user interactions with the courier device 136.

In addition, the computer-readable media 1104 may also store data, data structures and the like, that are used by the functional components. Depending on the type of the courier device 136, the computer-readable media 1104 may also optionally include other functional components and data, such as other modules and data 1112, which may include applications, programs, drivers, etc., and the data used or generated by the functional components. Further, the courier device 136 may include many other logical, programmatic, and physical components, of which those described are merely examples that are related to the discussion herein.

The communication interface(s) 1106 may include one or more interfaces and hardware components for enabling communication with various other devices, such as over the network(s) 106 or directly. For example, communication interface(s) 1106 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 11 further illustrates that the courier device 136 may include a display 1014, which may be the any of various types of displays. The courier device 136 may further include the one or more I/O devices 1108. The I/O devices 1108 may include speakers, a microphone, a camera, and various user controls (e.g., buttons, a joystick, a keyboard, a keypad, etc.), a haptic output device, and so forth. Other components included in the courier device 136 may include various types of sensors, which may include a GPS receiver 1116 able to indicate location information, as well as other sensors (not shown) such as an accelerometer, gyroscope, compass, proximity sensor, and the like. In some cases, the GPS receiver 1116 may be used by the courier application 138 to determine a current geographic location of the courier device 136. Additionally, or alternatively, the communication interfaces 1106 may be used to determine the current location of the courier device, such as based on communication with nearby cell towers, wireless access points, and the like. In some examples, the courier application 138 may send this location information periodically to the service computing device as an indicated location of the associated courier. Additionally, the courier device 136 may include various other components that are not shown, examples of which include removable storage, a power source, such as a battery and power control unit, and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more service computing devices programmed by executable instructions to perform operations comprising:
   training a model using, as training data, past order information for a plurality of past orders for delivery of items from a first plurality of merchants by couriers to delivery locations, the model trained to use a clustering algorithm for determining clusters of pickup locations within a threshold distance of each other and capable of being formed into combined ordering groups of merchants, the model further trained to determine the clusters based on accessing mapping information to determine geographic location information for received pickup locations;
   receiving, from a plurality of merchant devices associated with a second plurality of merchants, respectively, electronic communications indicating respective pickup locations associated with respective merchants of the second plurality of merchants;
   accessing, by the trained model, the respective pickup locations and the mapping information to identify, based at least on the clustering algorithm, a cluster of the respective pickup locations within the threshold distance of each other, wherein the respective merchants corresponding to the identified cluster of the respective pickup locations are a subset of the second plurality of merchants;
   accessing a set of rules that define requirements for forming a group of merchants for combined ordering from identified clusters of pickup locations, the set of rules applied for determining that merchants corresponding to identified clusters can be grouped together for combined order and delivery of items;
   evaluating the identified cluster of the respective pickup locations against the set of rules to determine that a group of merchants of the respective merchants corresponding to the identified cluster of respective pickup locations can be grouped together for combined order and delivery of items;
   based on determining the group of merchants, sending, to a buyer device, merchant information that causes, at least in part, an application executing on the buyer device to present a user interface including information about the group of merchants, the information about the group of merchants including an indication that items ordered from the merchants in the group of merchants are available for combined order and delivery;

determining, based at least on location information received via a GPS receiver of a first merchant device associated with a first merchant whose pickup location was not previously within the threshold distance of the group of the respective pickup locations, that the first merchant has relocated to a location at which the pickup location of the first merchant is located within the threshold distance of the respective pickup locations in the group of the respective pickup locations of the group of merchants;

based at least on determining that the pickup location of the first merchant has relocated to be currently within the threshold distance of the respective pickup locations of the group of merchants, and based on the trained model and the set of rules indicating that the first merchant can be included in the group of merchants, adding the first merchant to the group of merchants; and based at least on adding the first merchant to the group of merchants, sending, to the buyer device, updated merchant information that causes, at least in part, the application executing on the buyer device to present the user interface including updated information about the group of merchants including information related to items offered by the first merchant.

2. The system as recited in claim 1, wherein at least the first merchant is a mobile merchant.

3. The system as recited in claim 1, the operations further comprising:

receiving, from the buyer device, an order for a first item offered by the first merchant in the group of merchants and a second item offered by a second merchant in the group of merchants;

determining that a predicted first preparation time for the first item is a longer preparation time and a predicted second preparation time for the second item is a shorter preparation time that is shorter than the longer preparation time;

based on determining that the predicted first preparation time for the first item is the longer preparation time, sending, to the first merchant device associated with the first merchant, a first pickup time for the first item; and based on determining that the predicted second preparation time for the second item is the shorter preparation time, sending, to a second merchant device associated with the second merchant, a second pickup time for the second item, wherein the second pickup time for the second item is based at least in part on the first pickup time.

4. The system as recited in claim 3, the operations further comprising:

determining the predicted first preparation time for the first item by receiving an indication of a first merchant load based at least in part on a number of orders received and to be prepared by the first merchant, and comparing the first merchant load with past order information indicating preparation times for the first item associated with past first merchant loads to determine the predicted first preparation time.

5. The system as recited in claim 3, the operations further comprising:

sending, to a first courier device associated with a first courier, information for picking up the first item at the first pickup time and the second item at the second pickup time; and sending, to a second courier device associated with a second courier, an indication of a handoff location for picking up the first item and the second item, and an indication of a delivery location associated with the buyer device.

6. The system as recited in claim 5, the operations further comprising:

determining, based on location information received via a GPS receiver of the first courier device, an indicated geographic location of the first courier device; and sending, to the second courier device, an indication that the handoff location corresponds to the indicated geographic location of the first courier device.

7. A method comprising:

training, by one or more processors, a model using, as training data, past order information for a plurality of past orders for delivery of items from a first plurality of merchants by couriers to delivery locations, the model trained to use a clustering algorithm for determining clusters of pickup locations within a threshold distance of each other and capable of being formed into combined ordering groups of merchants, the model further trained to determine the clusters based on accessing mapping information to determine geographic location information for received pickup locations;

receiving, by the one or more processors, from a second plurality of merchant devices associated with a plurality of merchants, respectively, electronic communications indicating respective pickup locations associated with respective merchants of the second plurality of merchants;

accessing, by the trained model, the respective pickup locations and the mapping information to identify, based at least on the clustering algorithm, a cluster of the respective pickup locations within the threshold distance of each other, wherein the respective merchants corresponding to the identified cluster of the respective pickup locations are a subset of the second plurality of merchants;

accessing a set of rules that define requirements for forming a group of merchants for combined ordering from identified clusters of pickup locations, the set of rules applied for determining that merchants corresponding to identified clusters can be grouped together for combined order and delivery of items;

evaluating the identified cluster of the respective pickup locations against the set of rules to determine that a group of merchants of the respective merchants corresponding to the identified cluster of respective pickup locations can be grouped together for combined order and delivery of items;

based on determining the group of merchants, sending, to a buyer device, merchant information that causes, at least in part, an application on the buyer device to present a user interface including information about the group of merchants, the information about the group of merchants including an indication that items ordered from the merchants in the group of merchants are available for combined order and delivery;

determining, based at least on location information received via a GPS receiver of a first merchant device associated with a first merchant whose pickup location was not previously within the threshold distance of the group of the respective pickup locations, that the first merchant has relocated to a location at which the pickup location of the first merchant is located within the threshold distance of the respective pickup locations in the group of the respective pickup locations of the group of merchants;

based at least on determining that the pickup location of the first merchant has relocated to be currently within the threshold distance of the respective pickup locations of the group of merchants, and based on the trained model and the set of rules indicating that the first merchant can be included in the group of merchants, adding the first merchant to the group of merchants; and based at least on adding the first merchant to the group of merchants, sending, to the buyer device, updated merchant information that causes, at least in part, the application executing on the buyer device to present the user interface including updated information about the group of merchants including information related to items offered by the first merchant.

8. The method as recited in claim 7, wherein at least the first merchant is a mobile merchant.

9. The method as recited in claim 7, further comprising:
receiving, from the buyer device, an order for a first item offered by the first merchant in the group of merchants and a second item offered by a second merchant in the group of merchants;
determining that a predicted first preparation time for the first item is a longer preparation time and a predicted second preparation time for the second item is a shorter preparation time that is shorter than the longer preparation time;
based on determining that the predicted first preparation time for the first item is the longer preparation time, sending, to the first merchant device associated with the first merchant, a first pickup time for the first item; and
based on determining that the predicted second preparation time for the second item is the shorter preparation time, sending, to a second merchant device associated with the second merchant, a second pickup time for the second item, wherein the second pickup time for the second item is based at least in part on the first pickup time.

10. The method as recited in claim 9, further comprising:
determining the predicted first preparation time for the first item by receiving an indication of a first merchant load based at least in part on a number of orders received and to be prepared by the first merchant, and comparing the first merchant load with past order information indicating preparation times for the first item associated with past first merchant loads to determine the predicted first preparation time.

11. The method as recited in claim 9, further comprising:
sending, to a first courier device associated with a first courier, information for picking up the first item at the first pickup time and the second item at the second pickup time; and
sending, to a second courier device associated with a second courier, an indication of a handoff location for picking up the first item and the second item from the first courier, and an indication of a delivery location associated with the buyer device.

12. The method as recited in claim 11, further comprising:
determining, based on location information received via a GPS receiver of the first courier device, an indicated geographic location of the first courier device; and sending, to the second courier device, an indication that the handoff location corresponds to the indicated geographic location of the first courier device.

13. One or more non-transitory computer-readable media maintaining instructions executable by one or more processors to configure the one or more processors to perform operations comprising:
training a model using, as training data, past order information for a plurality of past orders for delivery of items from a first plurality of merchants by couriers to delivery locations, the model trained to use a clustering algorithm for determining clusters of pickup locations within a threshold distance of each other and capable of being formed into combined ordering groups of merchants, the model further trained to determine the clusters based on accessing mapping information to determine geographic location information for received pickup locations;
receiving, from a plurality of merchant devices associated with a second plurality of merchants, respectively, electronic communications indicating respective pickup locations associated with respective merchants of the second plurality of merchants;
accessing, by the trained model, the respective pickup locations and the mapping information to identify, based at least on the clustering algorithm, a cluster of the respective pickup locations within the threshold distance of each other, wherein the respective merchants corresponding to the identified cluster of the respective pickup locations are a subset of the second plurality of merchants;
accessing a set of rules that define requirements for forming a group of merchants for combined ordering from identified clusters of pickup locations, the set of rules applied for determining that merchants corresponding to identified clusters can be grouped together for combined order and delivery of items;
evaluating the identified cluster of the respective pickup locations against the set of rules to determine that a group of merchants of the respective merchants corresponding to the identified cluster of respective pickup locations can be grouped together for combined order and delivery of items;
based on determining the group of merchants, sending, to a buyer device, merchant information that causes, at least in part, an application on the buyer device to present a user interface including information about the group of merchants, the information about the group of merchants including an indication that items ordered from the merchants in the group of merchants are available for combined order and delivery;
determining, based at least on location information received via a GPS receiver of a first merchant device associated with a first merchant whose pickup location was not previously within the threshold distance of the group of the respective pickup locations, that the first merchant has relocated to a location at which the pickup location of the first merchant is located within the threshold distance of the respective pickup locations in the group of the respective pickup locations of the group of merchants;
based at least on determining that the pickup location of the first merchant has relocated to be currently within the threshold distance of the respective pickup locations of the group of merchants, and based on the trained model and the set of rules indicating that the first merchant can be included in the group of merchants, adding the first merchant to the group of merchants; and based at least on adding the first merchant to the group of merchants, sending, to the buyer device, updated merchant information that causes, at least in part, the application executing on the buyer device to present the user interface including updated information about the group of merchants including information related to items offered by the first merchant.

14. The one or more non-transitory computer-readable media as recited in claim 13, the operations further comprising:

receiving, from the buyer device, an order for a first item offered by the first merchant in the group of merchants and a second item offered by a second merchant in the group of merchants;

determining that a predicted first preparation time for the first item is a longer preparation time and a predicted second preparation time for the second item is a shorter preparation time that is shorter than the longer preparation time;

based on determining that the predicted first preparation time for the first item is the longer preparation time, sending, to the first merchant device associated with the first merchant, a first pickup time for the first item; and based on determining that the predicted second preparation time for the second item is the shorter preparation time, sending, to a second merchant device associated with the second merchant, a second pickup time for the second item, wherein the second pickup time for the second item is based at least in part on the first pickup time.

15. The one or more non-transitory computer-readable media as recited in claim 14, the operations further comprising:

determining the predicted first preparation time for the first item by receiving an indication of a first merchant load based at least in part on a number of orders received and to be prepared by the first merchant, and comparing the first merchant load with past order information indicating preparation times for the first item associated with past first merchant loads to determine the predicted first preparation time.

16. The one or more non-transitory computer-readable media as recited in claim 14, the operations further comprising:

sending, to a first courier device associated with a first courier, information for picking up the first item at the first pickup time and the second item at the second pickup time; and sending, to a second courier device associated with a second courier, an indication of a handoff location for picking up the first item and the second item from the first courier, and an indication of a delivery location associated with the buyer device.

17. The one or more non-transitory computer-readable media as recited in claim 16, the operations further comprising:

determining, based on location information received via a GPS receiver of the first courier device, an indicated geographic location of the first courier device; and sending, to the second courier device, an indication that the handoff location corresponds to the indicated geographic location of the first courier device.

18. The system as recited in claim 1, wherein:
the trained model is further trained to determine a centroid corresponding to the identified cluster, and
the set of rules are further applied to determine a handoff location based at least on the centroid.

19. The system as recited in claim 18, the operations further comprising:

receiving, from the buyer device, an order for a first item offered by the first merchant in the group of merchants and a second item offered by a second merchant in the group of merchants;

sending an instruction to a first courier device to pickup the first item from the first merchant and the second item from the second merchant, and deliver the first item and the second item to the handoff location; and sending an instruction to a second courier device to pick up the first item and the second item from the handoff location, and deliver the first item and the second item to a delivery location designated by the order.

20. The system as recited in claim 19, the operations further comprising sending the instruction to the first courier device to specify a sequence for picking up the first item and the second item based at least on predicted preparation times of the first item and the second item.

* * * * *